United States Patent
Theuwissen

(10) Patent No.: US 9,503,698 B2
(45) Date of Patent: Nov. 22, 2016

(54) IMAGE SENSOR WITH SHADING DETECTION

(71) Applicant: HARVEST IMAGING BVBA, Bree (BE)

(72) Inventor: Albert Theuwissen, Bree (BE)

(73) Assignee: Harvest Imaging BVBA (BE)

( * ) Notice: Subject to any disclaimer, the term of this patent is extended or adjusted under 35 U.S.C. 154(b) by 232 days.

(21) Appl. No.: 13/956,833

(22) Filed: Aug. 1, 2013

(65) Prior Publication Data

US 2015/0036029 A1    Feb. 5, 2015

(51) Int. Cl.
| G06T 15/50 | (2011.01) |
| H04N 3/14 | (2006.01) |
| H04N 9/04 | (2006.01) |
| H04N 5/357 | (2011.01) |
| H04N 5/369 | (2011.01) |

(52) U.S. Cl.
CPC ............ *H04N 9/045* (2013.01); *H04N 5/3572* (2013.01); *H04N 5/3696* (2013.01)

(58) Field of Classification Search
CPC .......... H01L 27/14627; H04N 5/3572; H04N 5/367; H04N 9/045; G06F 3/0412; G06F 3/042; G06F 3/1423; G02F 1/13338; G06T 1/0007; G06T 2207/30201; G06T 2207/30212
USPC ........................................................ 348/273
See application file for complete search history.

(56) References Cited

U.S. PATENT DOCUMENTS

| 2002/0025164 A1 | 2/2002 | Suzuki |
| 2005/0225807 A1* | 10/2005 | Fainstain et al. ............ 358/3.26 |
| 2006/0125945 A1* | 6/2006 | Suzuki ........................... 348/311 |
| 2009/0002341 A1* | 1/2009 | Saito et al. .................... 345/175 |
| 2009/0268053 A1 | 10/2009 | Wang et al. |
| 2012/0249846 A1 | 10/2012 | Nishio et al. |

FOREIGN PATENT DOCUMENTS

| EP | 1227669 | 7/2002 |
| JP | 2005252023 | 9/2005 |
| JP | 2007019820 | 1/2007 |
| JP | 2012191378 | 10/2012 |

OTHER PUBLICATIONS

European Search Report in corresponding EP 13179010.7 dated Jan. 8, 2014.

* cited by examiner

*Primary Examiner* — Gregory J Tryder
*Assistant Examiner* — Kwang Lee
(74) *Attorney, Agent, or Firm* — Barnes & Thornburg LLP

(57) ABSTRACT

An image sensor comprising a plurality of pixels arranged in rows and columns, the plurality of pixels comprising: image pixels arranged for providing image data, and shading detection pixels arranged for providing signals from which a degree of shading can be derived, wherein the shading detection pixels are located in substantially the same area as defined by the image pixels.

15 Claims, 15 Drawing Sheets

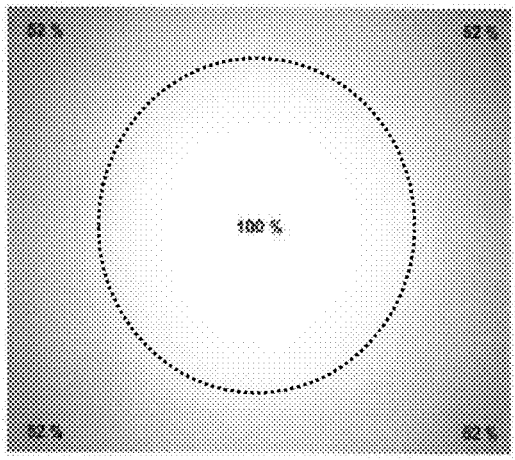
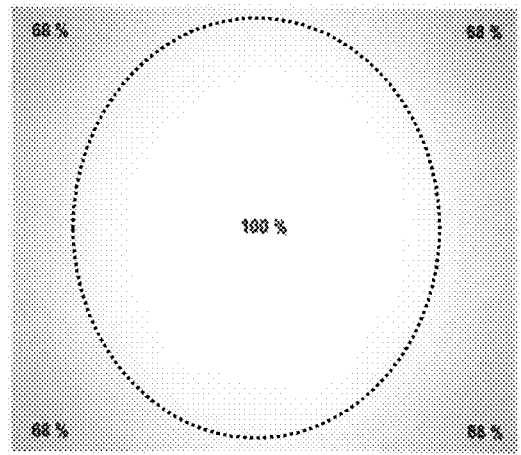
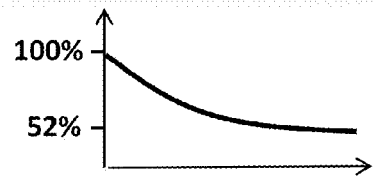
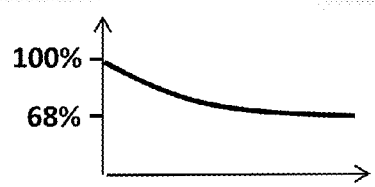
FIG. 1A                FIG. 1B
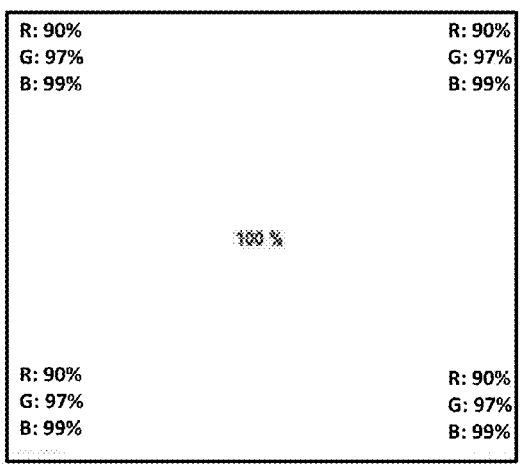
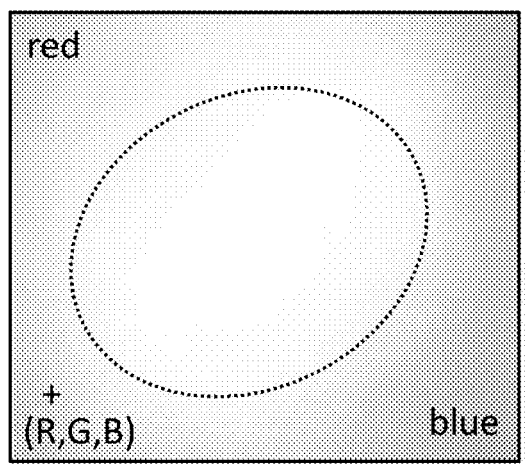
FIG. 1C                FIG. 1D

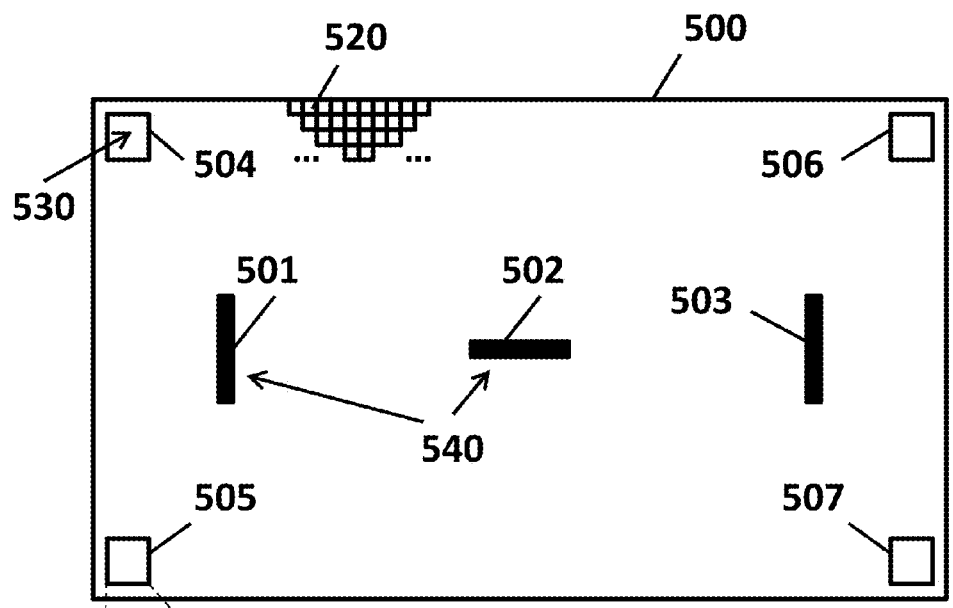
FIG. 12
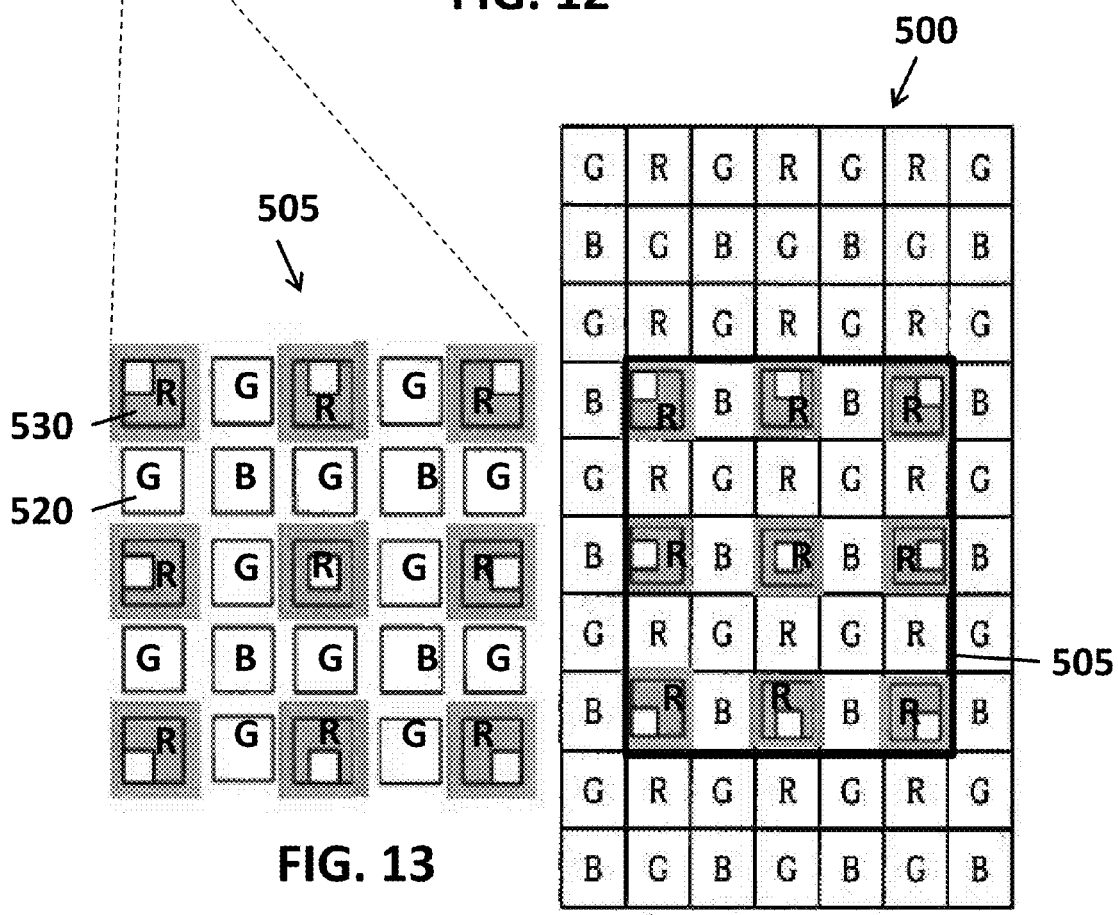
FIG. 13
FIG. 14

FIG. 22

IMAGE SENSOR WITH SHADING DETECTION

FIELD OF THE INVENTION

The present invention relates to the field of image sensors, and more particularly to image sensors having both image pixels and shading detection pixels.

BACKGROUND OF THE INVENTION

Digital cameras with a solid-state image sensor, in particular for example CMOS image sensors comprising a plurality of image pixels, located at a distance of a lens, are known in the art.

One of the problems with such cameras or image sensors is the problem of "shading" of the output signal provided by the pixels. Shading is the effect of a non-constant low spatial frequency output signal of the image sensor, even under uniform lighting conditions. This can be due to several reasons, for example:

1) Natural vignetting of the lens: all lenses have an intensity fall-off towards the corners of the sensor (away from the optical axis). This decrease in intensity of the incoming signal can be empirically described ($\cos^4$-law), and is depending on the focal length f and the F number of the lens. An example of the natural lens vignetting is shown in FIG. 1A. In the embodiment illustrated, the intensity decrease goes from 100% at the centre of the lens to 52% at the corners, but of course another value is also possible. An example of a fall-off curve is illustrated underneath the represented lens in FIG. 1A, but this is not limiting the present invention in any way. Other fall-off curves do occur. The lens vignetting cannot be avoided, even not in the most expensive lenses for professional applications.

2) Sensor vignetting: light rays fall nicely perpendicular on the sensor when they are parallel to the optical axis. But that is not the case in the corners of the sensor. Here the incoming rays come to the sensor with a deviating angle (known as the "chief ray angle") to the normal. It is well known that the sensitivity of the sensor is the highest for perpendicularly incoming light. Thus pixels that receive the incoming information under an angle deviating from the normal to the sensor provide a reduced output signal. It should be noted that this effect is depending on the focal length f of the lens, the F number of the lens, but also on the wavelength of the incoming radiation (due to the dispersive characteristics of the materials). A simple example of sensor vignetting is shown in FIG. 1B. In this figure the sensor vignetting shown is illustrated without taking into account the dependency on the wavelength.

3) Filter vignetting: most colour cameras use several optical filters in front of the image sensor (e.g. IR-filter, optical low-pass filter, etc). The transmission characteristics of these filters depend also on the angle of the incoming rays, as well as on the wavelength of the incoming light. In other words, the external filters add to the shading as well. An example of the vignetting caused by an IR-filter is shown in FIG. 1C. As can be seen from the figure, the transmission in the corners (e.g. 90%) is reduced compared to the centre transmission (e.g. 100%). But moreover, the attenuation is different for the various colours (e.g. 90% for red, 97% for green, 99% for blue). The red spectrum suffers most from this type of vignetting.

4) It can be seen from the above that there are several contributions to the shading. Ideally all shading components are nicely circular-symmetric w.r.t. the optical axis, but unfortunately that is not always the case. The problem becomes even more complicated when the shading of the three colours components has a different shape, or when their optical axes do not coincide. FIG. 1D shows an example of non-circular-symmetric colour shading (although not very well visible on a black and white picture). The top left of the image has too much red output, while the bottom right has too much blue output. This figure shows that the shading components (R, G, B) may change for every pixel location of the image sensor.

Methods for correcting shading effects, once it is known how much shading occurs, are known in the art. US2002025164A1 describes an image sensor 100 (illustrated in FIG. 2) for providing in-situ image correction values. The image sensor 100 has (using the terminology of the cited document) a "light receiving region" 110, consisting of an "effective pixel part" 110A, an "available pixel part" 110B, and an "optical black region" 110C, the latter being covered by a light shielding film 114. The effective pixel part 110A contains only image pixels 120 (for capturing image data), and thus does not contain non-image pixels (for any other purpose). The "available pixel part" 110B contains non-image pixels, in particular blocks of 3×3 shading detection pixels 130. The shading correction pixels 130 are organized in blocks A, B, C, D, E, F, G of 3×3 pixels, as illustrated in more detail in FIG. 3 and FIG. 4. As can be seen, these blocks are located outside of the "effective pixel part" 110A defined by the image pixels 120. They can thus only measure shading information at locations near the edge and corner of the "effective pixel part" 110A (i.e. the rectangular region defined by the "image pixels" 120). It is also clear from FIG. 2 that the "light receiving region" 110 comprises the sum of the areas of the "effective pixel part" 110A and the "available pixel part" 110B, and therefore is larger (i.e. occupies more space) than the "effective pixel part" 110A. This extra space (substrate area such as e.g. silicon area) does not yield extra image data, thus does not yield a higher resolution picture, and is therefore not efficiently used.

Two kinds of shading detection pixels are disclosed in US2002025164A1. A first kind of shading detection pixels is illustrated in FIG. 3, where an array of 3×3 shading pixels 130 is covered by a metal light shield 132. The light shield 132 holds small openings 131 through which the light can hit the pixels 130 underneath. The openings 131 in the metal shield 132 have an offset from the pixel centre (except for the pixel in the middle of the 3×3 array). A second kind of shading pixels is illustrated in FIG. 4, where each pixel 130 comprises a micro-lens 133, each micro-lens 133 having a predefined offset from the pixel centre. The amount of shading can be derived from the nine values provided by the shading pixels 130 when radiation falls onto these. A disadvantage of this image sensor 100 of FIG. 2 is that its light sensitive area is not efficiently used.

SUMMARY OF THE INVENTION

It is an object of embodiments of the present invention to provide a good image sensor with options for shading correction.

In particular, it is an object of the present to provide an image sensor and a digital camera comprising such an image sensor, wherein the light sensitive area is efficiently used.

This objective is accomplished by an image sensor and a digital camera according to embodiments of the present invention.

In a first aspect, the present invention provides an image sensor comprising a plurality of pixels arranged in rows and columns, the plurality of pixels comprising:

image pixels arranged and adapted for providing image data, and shading detection pixels arranged and adapted for providing signals from which an amount of shading can be deduced.

In accordance with the present invention, the shading detection pixels are located in the area defined by the image pixels, e.g. in the rectangular area defined by the outermost image pixels.

By providing shading detection pixels, the combined result of various shading effects (e.g. from the lens, the sensor, the IR filter, etc) can be determined at the position of the shading detection pixels. By locating the shading detection pixels in the same area as the image pixels, as opposed to outside of this area as is done in the prior art, a more accurate shading value is measured. Furthermore, in embodiments of the present invention, shading may be measured exactly on the location where shading is introduced.

By arranging the shading detection pixels in the same area as the (normal) image pixels, instead of outside of this (typically rectangular) area, the light sensitive area of the image sensor can be more efficiently used. Or in other words, for a given size of the light sensitive area a larger image resolution can be obtained. Or in other words, the area required for the image pixels and the shading pixels of the present invention can be smaller than in the prior art. All these advantages are related to cost reduction of an image sensor. In addition, the shading pixels need not only be located at the outside of the image sensor, which allows shading to be measured also e.g. halfway between the centre of the image sensor and its corners. But shading pixels may also be located in the center of the image sensor. The latter measurement position may be advantageous for creating a good reference.

Embodiments of the image sensor according to the present invention allow "on-the-fly" monitoring of the shading. This makes a correction algorithm possible that is independent of the focal length and the F-number of the lens, which may be very important for zoom lenses.

In an image sensor according to embodiments of the present invention, more particularly for instance in colour image sensors, the shading detection pixels may be arranged such that each shading detection pixel has at least one direct neighbouring image pixel.

By arranging the shading pixels such that each shading detection pixel has at least one direct neighbouring image pixel, preferably at least two or four or six or even eight, restoration of the image data, i.e. estimation of an image value for the pixel location occupied by the shading pixel, is facilitated, by known techniques, e.g. interpolation of neighbouring pixels having the same colour. In this way the visual artifacts are reduced as compared to the case where blocks of 3×3 adjacent shading pixels would be inserted into the image sensor. Thus the image quality loss of the image data provided by the image sensor of the present invention is negligible.

In an image sensor according to embodiments of the present invention, the shading detection pixels are organized in blocks of pixels comprising for instance nine shading detection pixels, each of the nine shading detection pixels being covered by a light shield having an aperture for passing incident light, each aperture having a centre that is offset from the corresponding photoelectric conversion element centre by a fixed distance that is predetermined for that shading detection pixel.

Shading pixels with a light-blocking shield, e.g. a metal light shield, having an aperture, as well as methods for using them to extract shading information are known in the art, and therefore need not be described in further detail here. Although the shading pixels of the prior art are organized in blocks of 3×3 adjacent pixels, the same or similar algorithms can be used also for other configurations, such as e.g. blocks of 1×9 shading pixels, or other configurations. What is different in the present invention, however, is the location of the shading detection pixels within the same area as the image pixels, as well as their arrangement.

In an image sensor according to embodiments of the present invention, the shading detection pixels may be organized in blocks of pixels comprising for instance nine shading detection pixels, each of the nine shading detection pixels being covered by a micro-lens having an optical axis, whereby each of the shading detection pixels of the block is disposed so that its optical axis is offset from the corresponding photoelectric conversion element centre by a fixed distance that is predetermined for that shading detection pixel.

Shading pixels with a micro-lens, and methods for using them are also known from the art, and need not be further explained here.

An image sensor according to embodiments of the present invention may have nine shading detection pixels in a block, wherein the nine shading detection pixels of the block are arranged in a 1×9 arrangement or in a 9×1 arrangement.

With a 1×9 arrangement is meant nine pixels located on a single row and on nine consecutive columns. With a 9×1 arrangement is meant nine pixels located on a single column and on nine consecutive rows. It is an advantage of using this arrangement over the prior art 3×3 block arrangement, because it allows that each shading pixels has at least six image pixels as direct neighbour, which can be used for calculating or estimating image data for the shading pixel location. In this way the quality loss because of the missing image pixels can be limited. This is true not only for a monochrome image sensor, but also for a colour image sensor.

In an image sensor according to embodiments of the present invention, the shading detection pixels may be organized in a 3×3 arrangement interleaved by a plurality of image pixels.

In a particular embodiment, the 3×3 arrangement of shading detection pixels may be provided as shading pixels interleaved with image pixels in a 5×5 block arrangement. With a 5×5 block is meant twenty-five pixels (e.g. 16 image pixels and 9 shading-detection pixels)—located on five consecutive rows and five consecutive columns. It is an advantage of using this arrangement over the prior art 3×3 block arrangement, because it allows that each shading pixels has eight image pixels as direct neighbour, which can be used for calculating or estimating image data for the shading pixel location. In this way the quality loss because of the missing image pixels can be limited.

In alternative embodiments, the 3×3 arrangement of shading detection pixels may be provided as shading pixels interleaved with image pixels in a 9×9 block, in a 5×9 block or in a 9×5 block. In such embodiments, an image pixel of a particular colour may be provided in between two shading pixels taking the place of image pixels of that particular colour. It is an advantage of using such arrangements that a regular Bayer pattern may be used (at least for the image pixels), while still sufficient colour information may be available from image pixels within the block for estimating colour values for the locations covered by shading pixels.

In particular embodiments, a Bayer colour pattern may be used for the image pixels, and the shading detection pixels may be located such as to take the place of green image pixels.

By locating the shading pixels in this way, each shading pixel has four green image pixels as direct neighbours, which can be used for calculating the missing green image data. In this way the quality loss because of the missing image pixels can be limited, or is even negligible.

In alternative embodiments, alternative colour patterns may be used for the image pixels and/or the shading pixels may be located such as to take the place of image pixels of another colour than green.

In an image sensor according to embodiments of the present invention, the shading detection pixels of each individual block may be of the same colour. This is of course the case for a monochrome sensor. For a colour sensor, the shading detection pixels of each block may comprise a colour filter of a single colour, which colour may differ for different blocks.

For example, if an RGB colour filter array is used, the nine shading pixels of one such block may all have a red colour filter. In this way, the block can provide a shading value for one particular colour component, in the example: red. In a monochrome image sensor the colour of the shading pixels of all the blocks would be the same.

The shading detection pixels may be arranged in sets, each set comprising a plurality of blocks, the shading detection pixels within each block comprising a colour filter of a single colour, the colour being different for at least two blocks in the set.

In particular embodiments, the colour is different for each block in the set.

For example, if an RGB colour filter array is used, a set would comprise a first block where all shading pixels have a red colour filter, a second block where all shading pixels have a green colour filter, and a third block where all shading pixels have a blue colour filter. The blocks forming the set would be advantageously closely arranged, e.g. separated by only one or only two or a few (e.g. less than five) image pixels, so that together they can provide shading information for different colours, but for substantially the same location on the image sensor.

An image sensor according to embodiments of the present invention may further comprise pixels adapted for other tasks than shading correction. An image sensor according to embodiments of the present invention may for example further comprise a plurality of focus-detection pixels for determining defocus information of a lens positioned at a distance from the image sensor, or a plurality of distance measurement pixels such as e.g. near-IR pixels for distance measurements.

Focus detection pixels are known in the art, as well as methods for obtaining defocus information and methods for focusing the lens based on that information. The focus detection pixels may be arranged e.g. on a single row, or on a single column, or in any other way. Image pixels and shading pixels and focus detection pixels can be conveniently combined in embodiments of the image sensor according to the present invention because: (1) focus detection pixels are preferably placed near the centre of the image sensor, where shading is low, while shading pixels are preferably located near the corners or the edges of the image sensor, where shading is high, (2) the same hardware or processor can be used for restoration of the image, by calculating or estimating image data for the locations taken by the shading pixels, e.g. based on interpolation.

It is to be noted that instead of focus detection pixels, also other types of pixels, e.g. "near-IR" pixels for estimating distance measurements, can be used in combination with the image pixels and shading detection pixels on the same image sensor, with many of the same advantages, in particular, the image-restoration algorithm (e.g. based on interpolation) would be independent of the type of these "other" pixels. In this way, several variants of the image sensor can be implemented with the same image pixels and shading-detection pixels, without modifying the image-restoration algorithm.

In a second aspect, the present invention provides a digital camera
comprising:
an image sensor according to any of the embodiments of the first aspect;
image correction circuitry for calculating image information for the pixel positions taken by the shading detection pixels;
shading-correction circuitry for correcting the image data based on shading information obtained from the shading detection pixels.

The same image correction circuitry may be used for calculating image information for the pixel positions taken by focus detection pixels, if present. The image correction circuitry may be adapted for copying or interpolating of data obtained from image pixels.

Shading correction techniques are known in the art. Two principles are used: either analog amplification (e.g. in the image sensor), or digital amplification (e.g. in the digital processor)

In a digital camera according to embodiments of the present invention, the image correction circuitry and the shading correction circuitry may comprise a programmable digital signal processor provided with an algorithm for interpolating image data, and for performing shading correction of the image data.

Thus in this embodiment, the shading correction is performed in the digital domain. This has the advantage of re-use of the same hardware component.

A digital camera according to embodiments of the present invention may further comprise:
the lens, and a drive mechanism for moving the lens;
auto-focus circuitry for generating a control signal and for applying the control signal to the drive mechanism for moving the lens for focusing an image on the image sensor.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1A shows an example of lens vignetting.
FIG. 1B shows an example of sensor vignetting.
FIG. 1C shows an example of vignetting caused by an IR filter.

FIG. 1D shows an example of vignetting whereby the shading of the three colour components have a different shape.

FIG. 12 shows a third embodiment of an image sensor according to aspects of the present invention. The image sensor comprises image pixels and shading detection pixels organized in blocks of 5×5 pixels. Each block is located in the same rectangular area as the image pixels, and comprises nine shading detection pixels. The image sensor may optionally further comprise focus detection pixels.

FIG. 13 shows in more detail a 5×5 block arrangement comprising nine shading detection pixels and sixteen image pixels, as can be used in the image sensor of FIG. 12. The shading pixels take the place of red image pixels in this example.

FIG. 14 shows in more detail another positioning of the 5×5 block comprising nine shading detection pixels, as can be used in the image sensor of FIG. 12. The shading pixels take the place of green image pixels.

FIG. 22 illustrates in more detail a 7×9 block arrangement comprising nine shading detection pixels and fifty-four image pixels, as can be used for instance in the image sensor of FIG. 12. The shading pixels take the place of red or green image pixels, and are separated from one another by a plurality of image pixels of which at least one is a red or green pixel as well.

Figure 2:
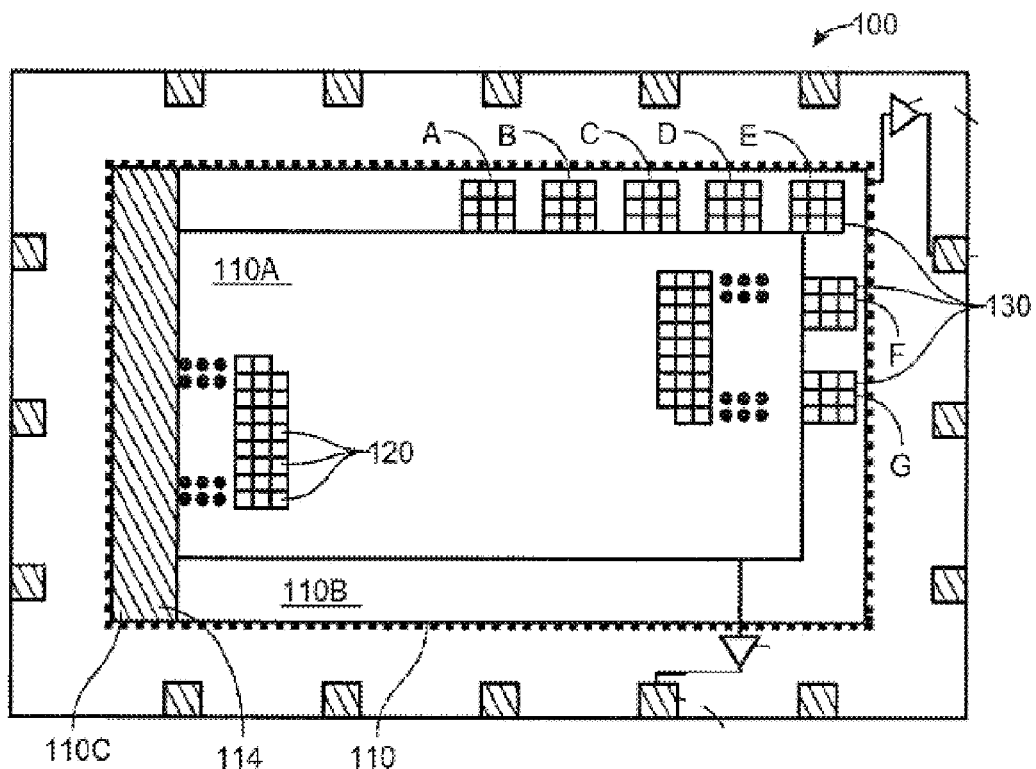
FIG. 2 shows a prior art image sensor having shading correction pixels arranged outside of the area defined by the image pixels.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or blocks thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes blocked together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

When reference is made to "radiation", reference is made to electromagnetic radiation of any type, e.g. visible light, UV light, infra-red light, X-rays, gamma rays. The present invention is particularly useful for electromagnetic radiation with a wavelength between 375 nm and 1000 nm.

When reference is made to "image pixels", reference is made to radiation-sensitive, e.g. light-sensitive, sensor elements of an image sensor array provided for capturing image data. The image pixels are typically overlaid with a colour filter. For example, if a so called "Bayer filter" is used as a colour filter, three kind of image pixels are created: R-pixels for capturing a red light component, G-pixels for capturing a green light component, and B-pixels for capturing a blue light component, but other colour filters may also be used.

When reference is made to "focus-detection-pixels" or "focus-pixels", reference is made to radiation-sensitive, e.g. light-sensitive elements, of an image sensor array especially adapted and arranged for detecting defocus-information. These pixels are usually not overlaid with the same colour filter as the surrounding image pixels. Part of these pixels may be deliberately shielded by a radiation-blocking screen, e.g. a metal screen.

When reference is made to "shading-detection-pixels" or "shading-pixels", reference is made to radiation-sensitive, e.g. light-sensitive, elements of an image sensor array especially adapted and arranged for detecting shading-information. These pixels are organized in blocks comprising, e.g. consisting of, nine shading pixels, the shading pixels being overlaid by a radiation-blocking, e.g. metal, shield with apertures, or by micro-lenses, the apertures or the micro-lens having a predefined offset from the pixel centre.

As described in the prior art section, digital cameras may suffer from different kinds of vignetting. FIG. 1A shows an example of lens vignetting, having a circular shape, whereby the light intensity is reduced with increasing distance from the centre, in the example shown, the light intensity is decreased down to 52% at the corners of the image sensor, located behind the lens. In the example shown, the values at each corner are identical, but they could also be different. FIG. 1B shows an example of sensor vignetting, where the light intensity is reduced to 68% of the value at the centre. FIG. 1C shows an example of vignetting caused by an IR filter, whereby the red value at the corners is reduced to 90%, the green value to 97%, and the blue value to 99%. FIG. 1D shows an example of vignetting whereby the shading of the three colour components have different shapes, e.g. three elliptical shapes, but with different sizes. Although not easy to represent on a black and white picture, the top left of the image has too much red output, while the bottom right has too much blue output. These are mere examples to illustrate that the vignetting may not be easy to model by a single value measured at one corner of an image sensor, as suggested in the prior art.

In practical situations, a combination of two or more kinds of vignetting may occur.

First Embodiment

Figure 5:
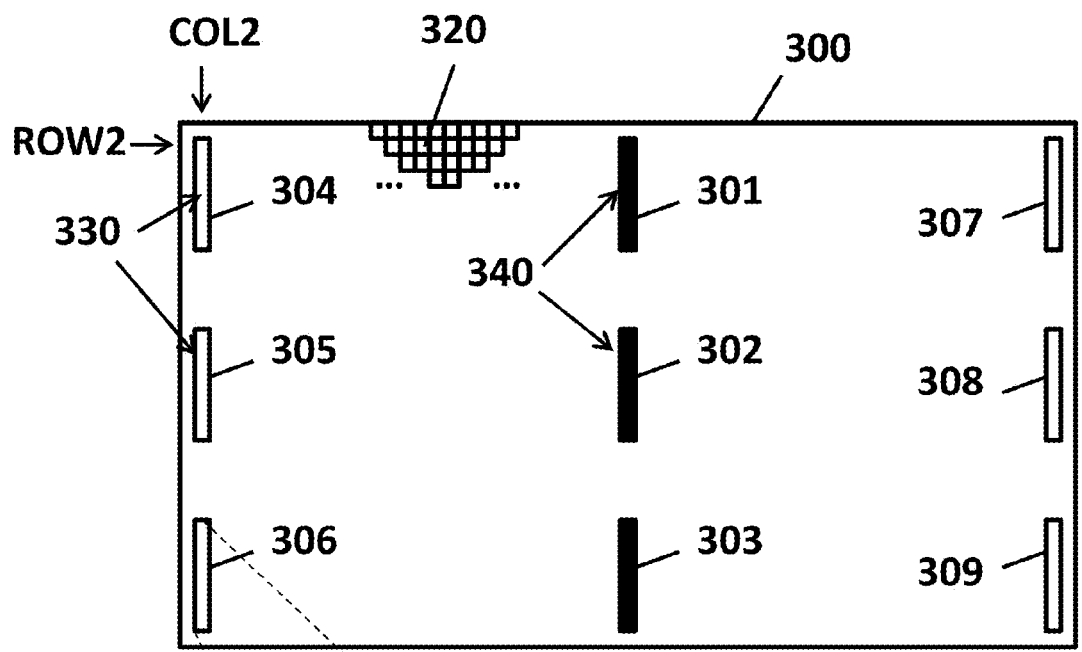
FIG. 5 shows a first embodiment of an image sensor according to aspects of the present invention. The image sensor comprises image pixels and shading detection pixels. The shading detection pixels are organized in blocks of 9×1 pixels, located in the same rectangular area as the image pixels. The image sensor may optionally further comprise focus detection pixels.
Figure 6:
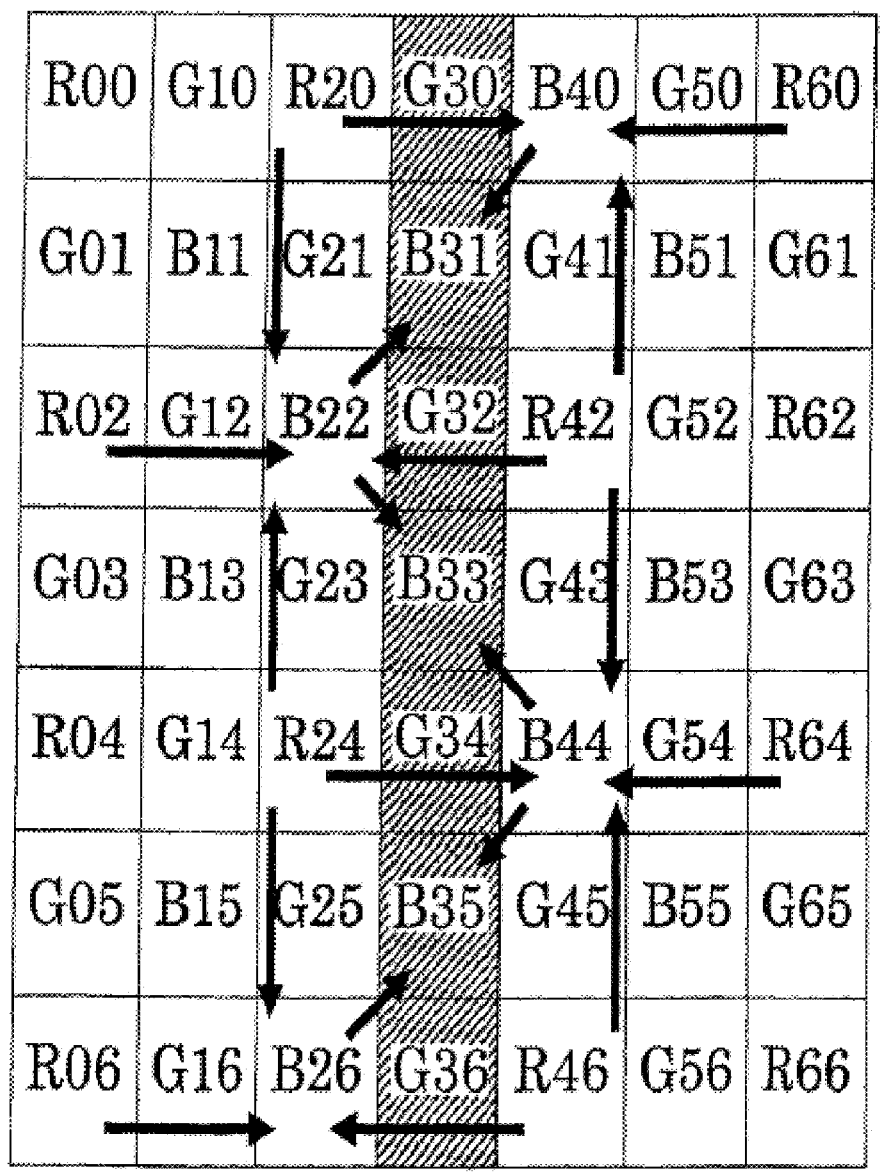
FIG. 6 illustrates a method known in the art of how image data can be calculated or estimated for the positions occupied by non-image pixels, such as shading pixels or focus detection pixels.

FIG. 5 shows a first embodiment of an image sensor 300 according to aspects of the present invention. The image sensor 300 comprises a plurality of image pixels 320 and a plurality of shading detection pixels 330. Each image pixel 320 and shading pixel 330 and (optional) focus detection pixel 340 (if present) has a photoelectric conversion element such as e.g. a photodiode for converting impinging radiation, e.g. light energy, into electrical energy, but only the image pixels are adapted, e.g. optimized for capturing image data. An aspect of the present invention is that the shading detection pixels of all embodiments of the present invention are located in the same area, e.g. rectangular area, as defined by the (normal) image pixels 320. The shading pixels 330 effectively take the place of some of the image pixels 320, in contrast to the prior art image sensor 100 (of FIG. 2), where the shading pixels 130 are located outside of the area occupied by the (normal) image pixels 120. Although the shading pixels 330 (FIG. 5) do not provide image data but only shading information, image data for these pixel locations can be calculated (e.g. estimated) by interpolation of the values from other image pixels located in the neighbourhood. US20090167927 explains how image data can be calculated for the pixel locations occupied by focus detection pixels, e.g. by copying the value of a close image pixel, or by interpolation of several values of image pixels of the same colour, located in the neighbourhood of the focus detection pixel. The same technique is applicable for determining image data for pixel locations taken by shading pixels. An example of the method is illustrated in FIG. 6, which is a copy of FIG. 13 of the US-document. As an example, image data for the shading pixel taking the place of image pixel B35 can be obtained by averaging the values obtained from the blue image pixels B44 and B26 (as suggested by the two arrows pointing to B35). The reader may consult the cited document for more details.

Locating the shading pixels 330 in the same area, e.g. rectangular area, as defined by the image pixels 320 offers several advantages:

(1) No separate readout circuitry is required for reading out the values of the shading pixels; these pixels may be readout together with, and using the same circuitry as is used for the image pixels 320.

(2) The light sensitive area of the image sensor can be used more efficiently, e.g. the size required for an image sensor having a particular image resolution (e.g. 640×480 pixels) need not be increased because extra shading pixels need to be placed outside of the image area. Or stated in other words, for a given size of substrate material, the resolution of the image to be captured can be increased.

Figure 19:
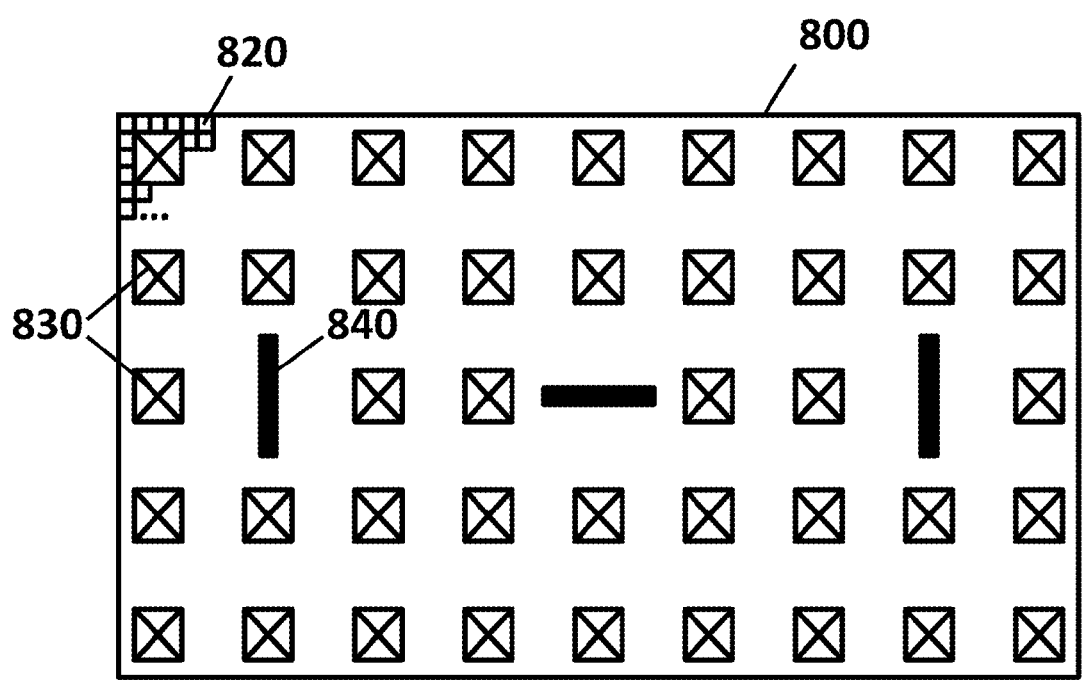
FIG. 19 shows an embodiment of an image sensor according to aspects of the present invention. The crossed square boxes represent either blocks or sets comprising shading pixels, and are located at various places within the light sensitive area, not only near the edges or in the corners. Optionally, this image sensor comprises focus detection pixels.

(3) Although the shading pixels 330 are drawn here close to the edges of the image sensor 300, that is not absolutely required, and the shading pixels may be arranged differently, e.g. distributed over the entire image sensor 300 (as will be illustrated further in FIG. 19). In this way multiple values of shading can be obtained from a single image sensor, and thus the accuracy of shading correction can be increased as compared to an image sensor where only one value indicative of the amount of shading can be obtained.

The image sensor 300 of this embodiment may or may not have focus detection pixels 340. The example shown in FIG. 5 has three vertical zones (or regions) 301, 302, 303 of focus detection pixels. A zone of focus detection pixels may be e.g. a single partial column having focus detection pixels, but the focus detection pixels (if present) may also be organized differently, e.g. in partial rows, or combinations of partial rows and columns, or as partial column pairs or as partial row pairs. The focus detection pixels may or may not be read out by dedicated circuitry, for allowing fast focusing of the lens before capturing the actual image, but that is not absolutely required, and the focus detection pixels may be read out by the normal readout circuitry used for reading the image pixels. As explained above, focus detection pixels 340 have nothing to do with shading detection or correction, but they may be advantageously incorporated in the same image sensor 300, because:

(1) in this way other (e.g. dedicated) focus detection sensors and circuitry can be avoided, (2) the same or similar interpolation means and methods (e.g. a Digital Signal Processor adapted with an appropriate algorithm) can be used for estimating image data for the pixel locations occupied by the focus detection pixels 340 and the shading pixels 330, (3) the preferred locations for arranging focus detection pixels 340 are different from the preferred locations for arranging shading pixels 330, thus focus detection pixels and shading pixels can be suitably combined on the same image sensor 300. Indeed, focus detection pixels 340 are typically located near the centre of the image sensor 300, because that is usually part of the picture that needs to be "sharp", whereas shading pixels 330 are typically not located near the centre, but rather away from the centre, e.g. near the edges or near the corners, because this is where the shading is usually largest, Furthermore, arrangements are possible where the similarities in the optical setup (alternating aperture openings) allows for synergy between shading correction and focus detection. Conjugated pairs of shading pixels can also function as focus detection pixels, as explained below with reference to FIG. 15. Additional focus pixel lines as illustrated in FIG. 5 may become unnecessary, thus decreasing the number of pixels where colour information needs to be interpolated from neighbouring pixels.

In the embodiment of FIG. 5, the shading pixels 330 are for instance organized in blocks of 9×1 pixels (i.e. 9 rows and 1 column), but that is not absolutely required, and other arrangements are possible as well, as will be discussed further. In the example of FIG. 5 the number of blocks having shading pixels is three on the left side of the image sensor 300 and three on the right side of the image sensor, but more than six blocks, or less than six blocks can also be used. For example, a variant of the image sensor 300 could only have the blocks 304, 306, 307 and 309 of shading pixels, located near the four corners of the image sensor.

In the example of FIG. 5, the blocks 304, 305 and 306 are located in the second column COL2 of the image sensor 300. This offers the advantage that there is one column of image pixels 320 present between the edge of the image sensor 300 and the blocks with shading pixels, which can be used for estimating image data for the locations occupied by the shading pixels, e.g. by interpolation. However, it is not absolutely required that the 9×1 blocks of shading pixels 330 are located in the second column, and e.g. the third or fourth column may also be used. Having at least two columns of image pixels 320 located between the edge of the image sensor 300 and the blocks of shading pixels 304, 305, 306 may offer the advantage that the interpolation quality can be even better, as there may be R, G, and B pixels present on the left of the shading pixels. Alternatively, it is possible to deviate from a normal or typical colour pattern (e.g. Bayer configuration) in the neighbourhood of the shading pixel blocks. It is even possible to locate the shading pixels of the blocks 304, 305, 306 in the very first column, but then interpolation using pixels located on the left of the shading pixels is not possible anymore, and extrapolation or copying of image data would have to be used, which may provide visual artifacts. In the example shown in FIG. 5, the upper pixel of the block 304 is located in the second row ROW2, but also that is not absolutely required, and the block 304 could also start in the first row, or on the third or further row.

Figure 3:
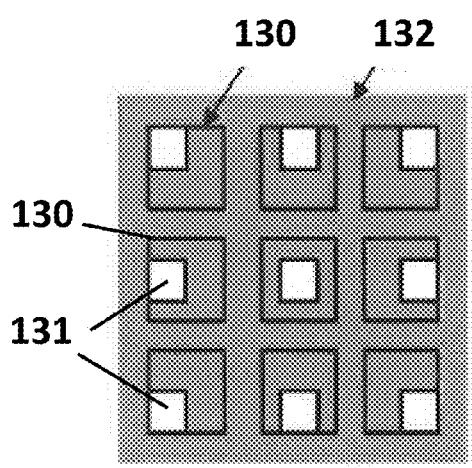
FIG. 3 shows a prior art 3×3 block of shading detection pixels having a light shield with apertures having an offset w.r.t. the pixel centre.
Figure 4:
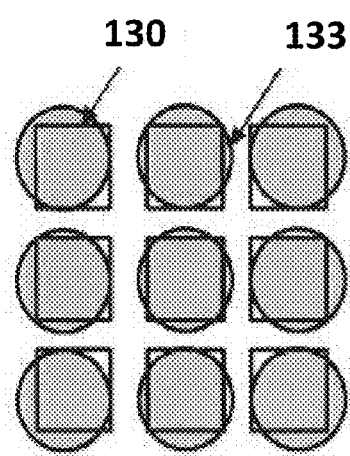
FIG. 4 shows a prior art 3×3 block of shading detection pixels having micro lenses with an optical axis having an offset w.r.t. the pixel centre.
Figure 7:
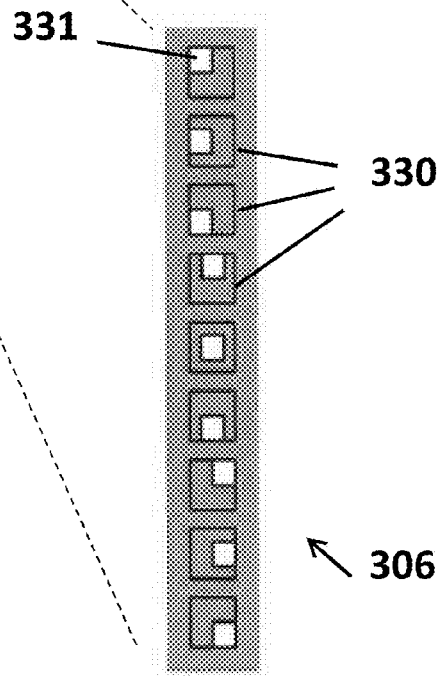
FIG. 7 shows in more detail a block comprising nine shading detection pixels organized as a block of 9×1 pixels, as can be used in the image sensor of FIG. 5.

In an embodiment, each block 304, 305, 306, 307, 308, 309 comprising shading pixels 330 of the image sensor 300 shown in FIG. 5 consists of nine shading detection pixels 330, as shown in more detail in FIG. 7. In other embodiments, each block may consist of, or comprise more than nine shading pixels. The shading detection pixels 330 of FIG. 7 are organized as blocks of 9×1 pixels (i.e. arrays of 9 consecutive rows and 1 column). The shading pixels 330 shown are arranged on a single column and not as a block of 3×3 pixel locations (compare FIG. 3). This offers the advantage that the image data for these locations can be estimated with a higher accuracy, or with less visible artefacts. Indeed, if the 3×3 blocks shown in FIG. 3 would be used in the image sensor 300 instead of the 9×1 blocks, it would be more difficult to obtain "good" image data values for the nine pixel locations taken by the shading pixels, especially for the pixel in the centre of the 3×3 block, and hence the risk of having visual artefacts would increase. Although the nine shading pixels 330 shown in FIG. 7 are of the shielded type with an aperture similar to those of FIG. 3 but arranged differently, it is also possible to use shading pixels 330 with micro-lenses similar to those of FIG. 4, but arranged differently.

A monochrome sensor does not have colour filters, but for sensors in colour imagers, the shading pixels are typically provided with a colour filter, as it may be desired to measure shading in one or more of the colour planes.

In a variant of FIG. 5 (not shown), the shading pixels 330 are not only organized in blocks, but also in sets comprising multiple blocks. For example, the zone 306 would not comprise a single 9×1 array (block) of shading pixels (as illustrated in FIG. 7), but e.g. three such arrays (blocks), the shading pixels of one block comprising e.g. a red colour filter, the shading pixels of a second block comprising e.g. a green colour filter, and the shading pixels of a third block comprising e.g. a blue colour filter. The blocks could e.g. be arranged parallel to each other, and would be separated by one or two or more (partial) columns of image pixels. This will be illustrated in FIG. 10 and FIG. 11 for a horizontal orientation of the blocks comprising shading pixels, but the same principles can be used here.

Second Embodiment

Figure 8:
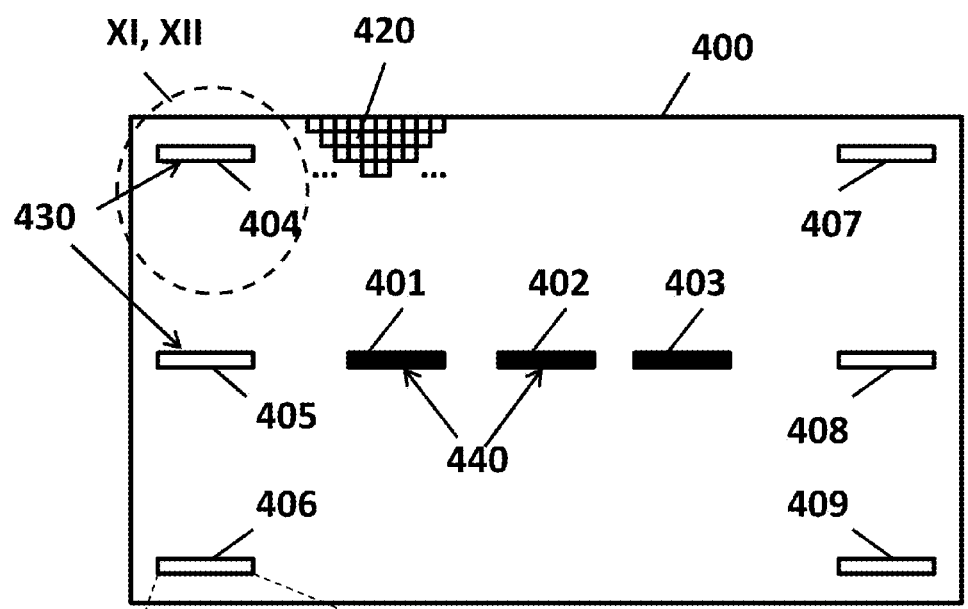
FIG. 8 shows a second embodiment of an image sensor according to aspects of the present invention. The image sensor comprises image pixels and shading detection pixels. The shading detection pixels are organized in blocks of 1×9 pixels, located in the same rectangular area as the image pixels. The image sensor may optionally further comprise focus detection pixels.

FIG. 8 shows a second embodiment of an image sensor 400 according to aspects of the present invention. The image sensor 400 comprises a plurality of image pixels 420 and a plurality of shading detection pixels 430, the latter being organized in blocks of 1×9 pixels (i.e. arrays of 1 row and 9 consecutive columns). The shading pixels 430 are located in the same rectangular area as the area defined by the image pixels 420, and they effectively replace some of the image pixels.

The main difference between this embodiment and that of FIG. 5 is that the blocks 404 to 409 of shading pixels are arranged horizontally as 1×9 arrays, instead of vertically as 9×1 arrays. The image sensor 400 may optionally comprise focus detection pixels 440, which in the embodiment illustrated are arranged also horizontally, although that is not absolutely required. All the advantages described for the first embodiment are also applicable here. Furthermore, there may be an additional advantage in the embodiment of FIG. 8 if the image sensor 400 is e.g. of the column-level ADC architecture, meaning that all columns can be read out simultaneously, and the rows are read out one by one. In the example shown in FIG. 8, a typical approach would be to read out the row containing the focus detection pixels 440 first, possibly multiple times, for focusing the lens, and then to read out any rows containing shading pixels, for determining the amount of shading, and then to read out all the rows for capturing the image data, where after shading correction can be applied to the image data just read, based on the information read from the shading pixels. However, other readout techniques may also be used.

Similar to the first embodiment, the shading pixels 430 do not provide actual image data but only shading information, but image data for these pixel locations can be calculated (e.g. estimated) by interpolation of actual image pixels located in the neighbourhood of the shading pixels 430.

Figure 9:
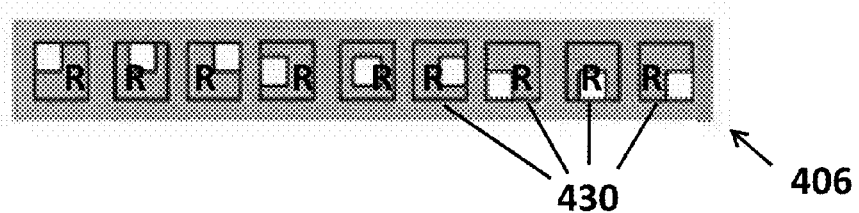
FIG. 9 shows in more detail a block comprising nine shading detection pixels organized as a block of 9×1 pixels, as can be used in the image sensor of FIG. 8.

FIG. 9 shows the block 406 comprising shading pixels 430 in more detail. It comprises nine shading detection pixels 330, organized as blocks of 1×9 pixels (i.e. arrays of 1 row and 9 consecutive columns). The shading pixels 430 shown are arranged on a single row and not as a block of 3×3 pixel locations (compare FIG. 3). This offers the advantage that the image data for the pixel locations taken by the shading pixels can be estimated with higher accuracy, and thus with less artefacts. The nine shading pixels 430 shown in FIG. 7 are of the "shielded type with an aperture", similar to those of FIG. 3 but arranged differently and located inside the area defined by the (normal) image pixels, but it is also possible to use shading pixels 430 with micro-lenses, similar to those of FIG. 4 but arranged differently and located inside the area defined by the image pixels. In the embodiment illustrated, the nine shading pixels have a red colour filter, hence the indication R on these pixels in the illustration.

Also in the second embodiment, it is advantageous to locate the block 404 of shading pixels 430 not on the first row, but on the second or further row, because then there would be one or two rows of image pixels above the shading pixels, which can improve the estimation of image data for the locations taken by the shading pixels. The same applies for the block 407. For the same reasons, the blocks 406 and 409 are advantageously not located on the bottom row, but preferably one or two or more rows higher.

The nine shading detection pixels 430 of the block shown in FIG. 9 all have the same colour filter, e.g. a red colour filter, but other colour filters may also be used. The outputs of the block of nine shading pixels of FIG. 9 can be used to calculate a single "red" shading value, (corresponding to the number 90% in the example of FIG. 1C).

In practice, however, one may not only be interested in the red shading component, but also in other shading components, e.g. green and blue shading component, or any other colour.

Figure 10:
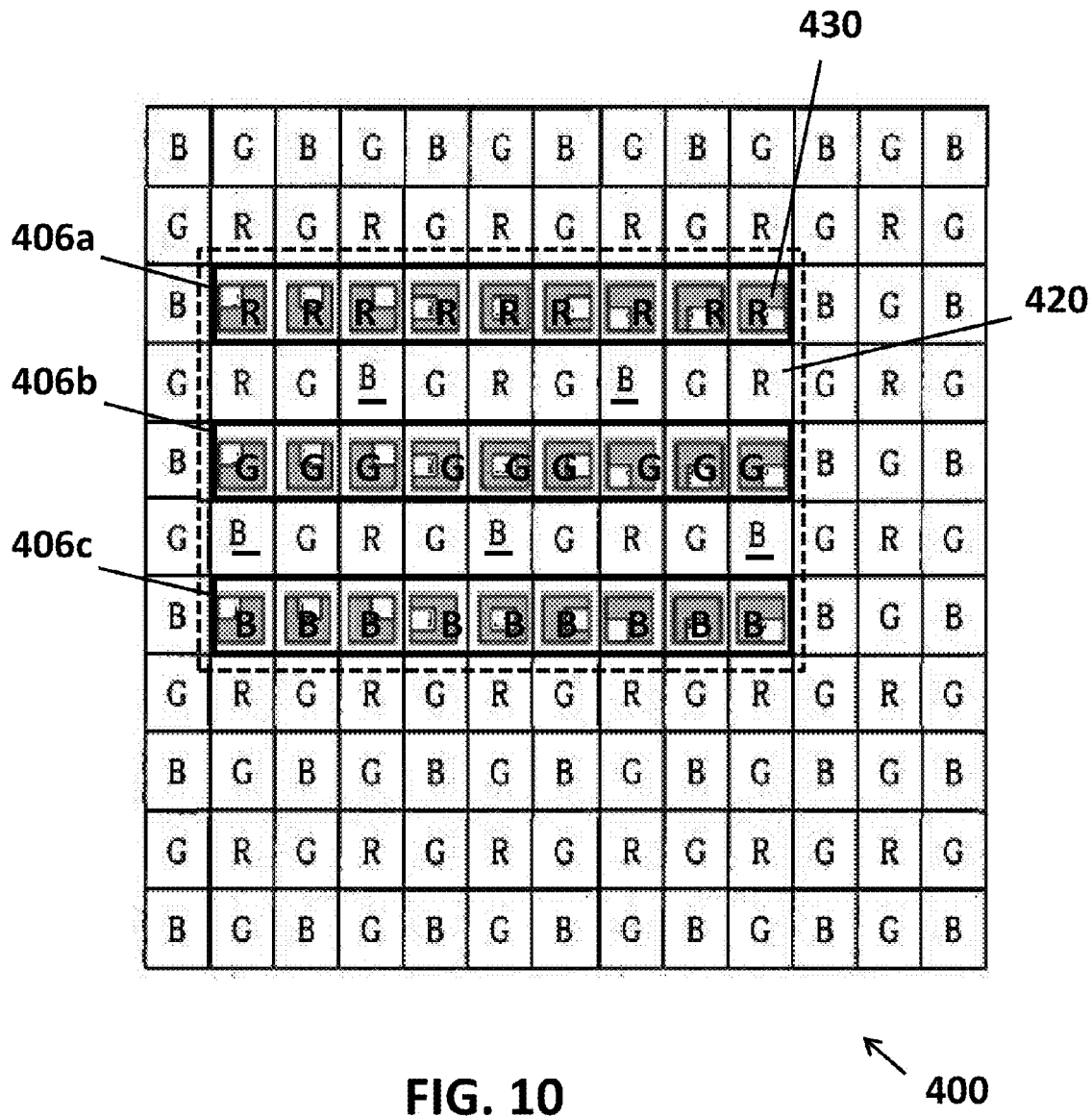
FIG. 10 shows a set comprising three blocks, as can be used in the image sensor of FIG. 8. Each block comprises nine shading detection pixels. The set is organized, as an example only, as three blocks of 1×9 pixels, separated from each other by one row of image pixels.

FIG. 10 shows a set comprising three blocks 406a, 406b, 406c, each block comprising nine shading pixels 430 arranged as a 1×9 array (1 row and 9 consecutive columns). The blocks of FIG. 10 are separated by a single row of image pixels 420, which can be used for calculating, e.g. estimating image data for the locations occupied by the shading pixels 430. The image pixels 420 in FIG. 10 are indicated by R, G and B pixels, and are arranged according to the well-known Bayer configuration, except for some of the image pixels located between the blocks of shading pixels, where deviations from the standard Bayer configuration are underlined in the figure for illustrative purposes. An advantage of deliberately deviating from the standard Bayer pattern in this particular example, is e.g. because otherwise there would be no image pixel with a blue colour component within the dotted area indicating the set, so image data emanating from image pixels located outside of the dotted area would have to be used for interpolation, which may cause visual artefacts. The deviation from the Bayer pattern thus limits such visual artefacts. Nevertheless, using a standard Bayer configuration for the image pixels is also possible.

It is not mandatory that the upper block 406a of the set comprises a red colour filter, and that the middle block 406b of the set comprises a green colour filter, and that the lower block 406c of the set comprises a blue colour filter, as long as the shading pixels within a block all have the same colour filter, and the shading pixels of different blocks have a different colour filter. In other words, the order of the blocks could be altered, e.g. the upper block could comprise blue pixels, the middle block could comprise red pixels, and the lower block could comprise green pixels, or any other variation may also be used. It is to be noted that the set of FIG. 10 actually occupies an array of five rows and nine columns, and comprises twenty-seven shading pixels 430 and eighteen image pixels 420.

Figure 11:
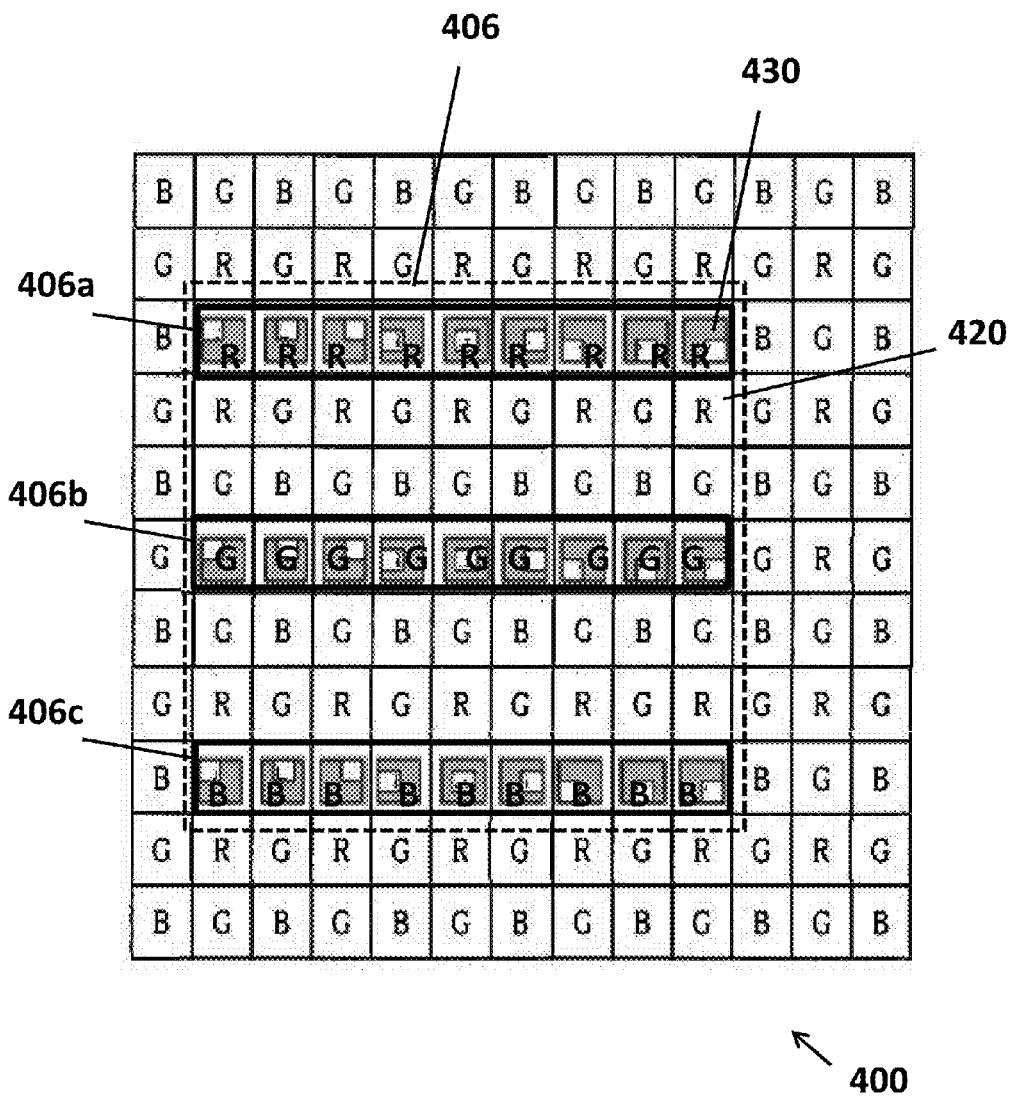
FIG. 11 shows a set comprising three blocks, as can be used in the image sensor of FIG. 8. Each block comprises nine shading detection pixels. The set is organized, as an example only, as three blocks of 1×9 pixels, separated from each other by two rows of image pixels.

Another variant of the second embodiment is shown in FIG. 11. FIG. 11 shows part of the image sensor 400 of FIG. 8, comprising image pixels 420 and shading correction pixels 430. The shading correction pixels are organized in sets (only set 406 is shown in FIG. 11), each set comprising three blocks 406a, 406b, 406c, each block comprising nine shading detection pixels 430. The main difference between the set of FIG. 11 and that of FIG. 10 is that the blocks 406a, 406b, 406c are now separated by two rows of image pixels 420 instead of only one. This offers the advantage that the standard Bayer pattern can be used also for the intermediated rows, which may simplify the image data estimation for the locations occupied by the shading pixels, and may further reduce visual artefacts. Again, it is not absolutely required that the upper block contains red pixels, the middle block contains green pixels, and the lower block contains blue pixels, i.e. the order of the blocks 406a, 406b, 406c could be altered. It is to be noted that the set of FIG. 11 actually occupies an array of seven rows and nine columns, and comprises twenty-seven shading pixels 430 and thirty six image pixels 420. It is further noted that by rotating the sets of FIG. 10 and FIG. 11 over 90° clockwise or counter clockwise, sets of the first embodiment (described above, but not shown) are obtained.

In variants of the embodiments of the second embodiment (not illustrated), the shading pixels are not located immediately adjacent one another. One or more image pixels may be provided in between two shading pixels. In another variant of the second embodiment (not shown), the shading pixels of a block are not located on a single row, but alternatingly on two rows, in a zig-zag structure.

Third Embodiment

FIG. 12 shows a third embodiment of an image sensor 500 according to aspects of the present invention. The image sensor 500 comprises a plurality of image pixels 520 and a plurality of shading detection pixels 530. The shading detection pixels are organized in blocks of 5×5 pixels comprising sixteen image pixels 520 and nine shading pixels 530. Also in this embodiment, the shading pixels 530 are located in the same rectangular area as the image pixels 520, (i.e. the area defined by the image pixels), and the shading pixels take the place of some of the image pixels.

The main difference between this embodiment and that of FIG. 5 is that the blocks 504 to 507 of shading pixels are arranged as square blocks, instead of partial columns. Optionally, the image sensor 500 of FIG. 12 further comprises focus detection pixels 540, which are arranged in the example of FIG. 12 in horizontal and vertical zones 501, 502, 503, but any other arrangement of the focus detection pixels may also be used. The advantages described for the first embodiment are also applicable here. As for the first and second embodiment, any kind of shading pixel may be used, e.g. shading pixels having a light-blocking shield, e.g. a metal light shield, and an aperture offset w.r.t. to the pixel centre, or shading pixels having a micro-lens offset w.r.t. to the pixel centre.

FIG. 13 shows the block 505 of shading pixels in more detail. The block 505 comprises a 5×5 pixel array with sixteen image pixels 520 and nine shading pixels 530. The shading pixels 530 are separated from each other by at least one image pixel 520 located between them. In the arrangement of FIG. 13, the shading pixels 520 take the place of original red image pixels, as can be seen by the colour of the image pixels. (The indication "R" on the shading pixels of FIG. 14 means that the shading pixels have a red colour filter). Although this arrangement can be used for determining shading information, it is not ideal because none of the sixteen image pixels 520 in the block would generate red image data, meaning that interpolation from outside of this block would have to be used for estimating red image data for the pixel positions taken by the shading pixels 530. This may lead to visual artefacts. A similar problem would occur when the nine shading pixels would take the place of originally blue image pixels (not shown).

A better positioning of the 5×5 block is shown in FIG. 14, which shows part of the image sensor 500, comprising shading pixels 530, whereby the shading pixels are arranged in blocks comprising nine shading pixels and sixteen image pixels, and wherein the shading pixels replace green image pixels. As can be seen in FIG. 14, this offers the advantage that each shading pixel is now surrounded by four green image pixels, two red image pixels and two blue image pixels as its direct neighbours, so that an estimate of the image data corresponding to the pixel locations taken by the shading pixels, in particular a green pixel, can be implemented by using any combination of the neighbouring green values, e.g. by averaging the four green values.

Figure 15:
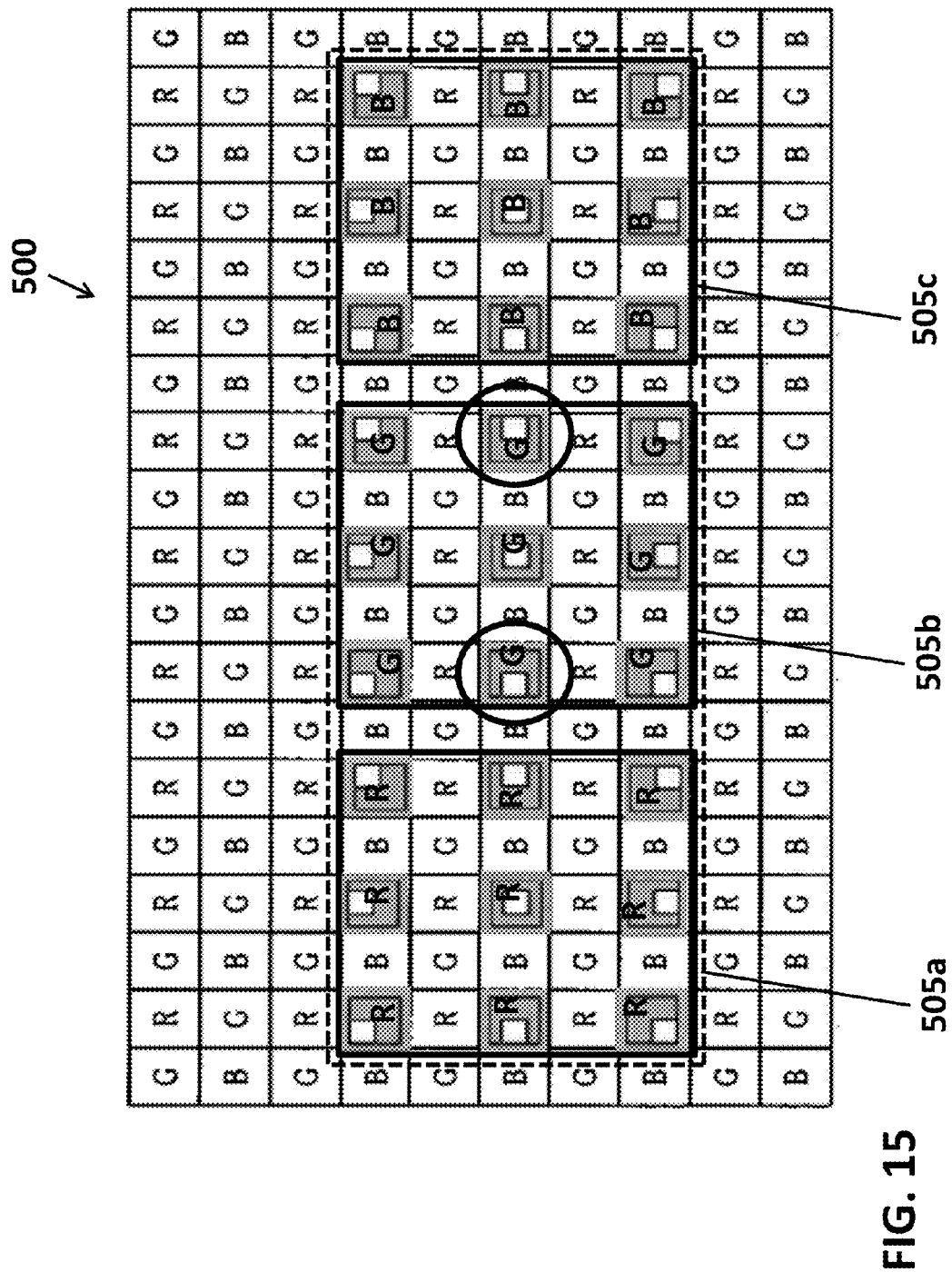
FIG. 15 shows a set comprising three blocks of 5×5 pixels, each block comprising nine shading detection pixels, as can be used in the image sensor of FIG. 12. The blocks are located on the same rows, and are separated from each other by one column of image pixels.

FIG. 15 shows a variant of the image sensor 500 of FIG. 12, where the shading pixels 430 are not only organized in blocks of 5×5 pixels comprising nine shading pixels, but wherein furthermore three blocks 505a, 505b, 505c form a set. The shading pixels of the first block 505a have a first colour filter (e.g. red), the shading pixels of the second block 505b have a second colour filter different from the first colour filter (e.g. green), and the shading pixels of the third block 505c have a third colour filter different from the first and from the second colour filter (e.g. blue). The outputs of the nine shading pixels of the first block 505a can be used to determine a shading value indicative for an incident red light component, the outputs of the nine shading pixels of the second block 505b can be used to determine a shading value indicative for an incident green light component, and the outputs of the nine shading pixels of the third block 505c can be used to determine a shading value indicative for an incident blue light component. When the image pixels 520 of the image sensor 500 are arranged according to the Bayer pattern, the shading pixels 430 preferably take the place of green image pixels, for each of the blocks. This allows for easy and accurate restoration of the image data, e.g. by interpolation of image data coming from one or more of the neighbouring green image pixels. The risk for visual artefacts is negligible for this arrangement. In fact a spatial sub-sampling by a factor of two occurs in the region occupied by the set. As described above, it is not important whether the block of red shading pixels is located on the left, or in the middle or at the right of the set, and any other order than the one shown in FIG. 15 can also be used.

Figure 16:
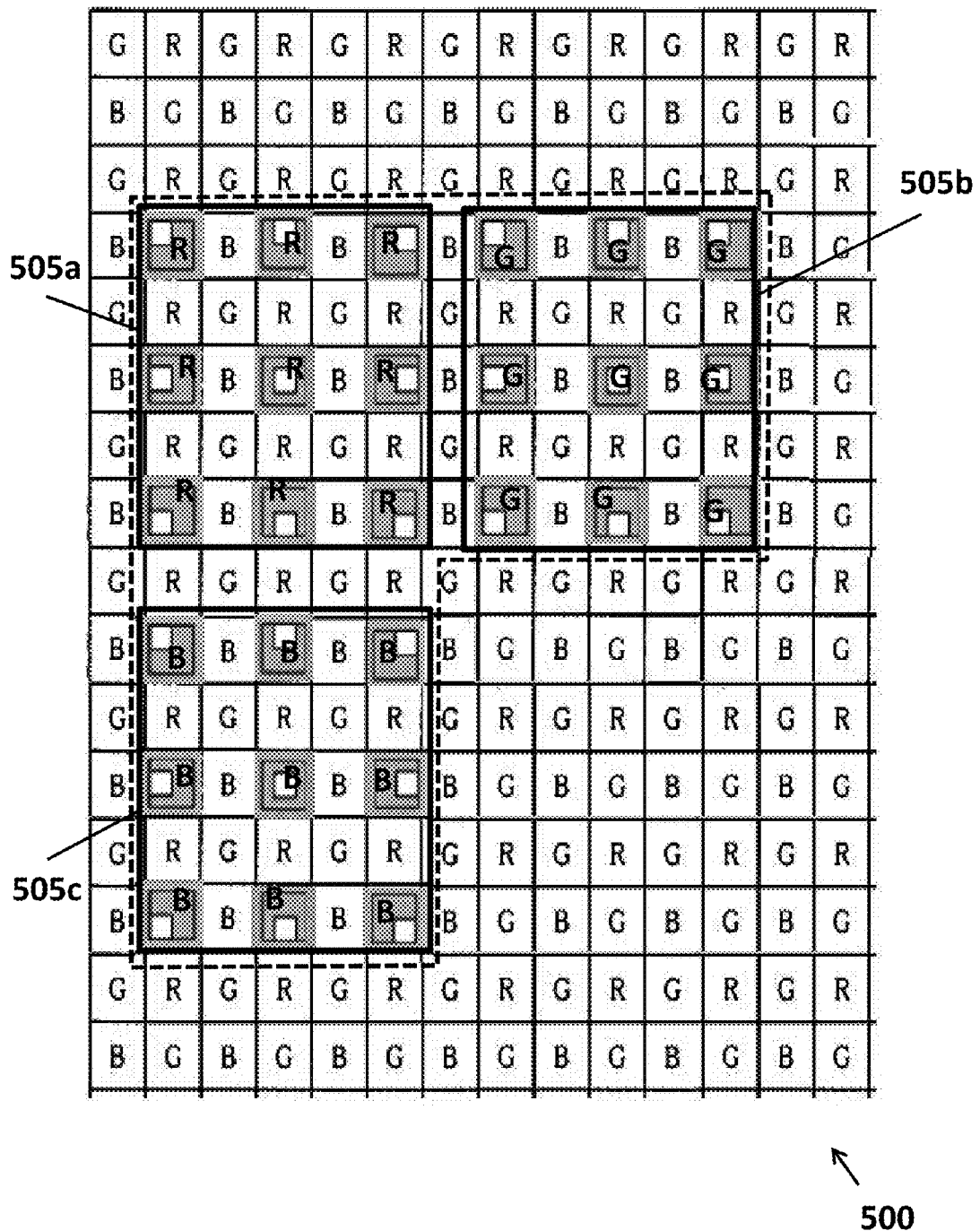
FIG. 16 shows a set comprising three blocks of 5×5 pixels, each block comprising nine shading detection pixels, as can be used in the image sensor of FIG. 12. The blocks are, as an example only, separated from each other by one column or one row of image pixels.

Whereas the three blocks of shading pixels of FIG. 15 are located next to each other (i.e. displaced horizontally with respect to one another), other arrangements are also possible, for example (not shown) on top of each other (i.e. displaced vertically), or as shown in FIG. 16 (organized in an L-shape), or in any other way (e.g. organized as a T-shape). Each block comprising nine shading pixels would yield a single shading value, thus a set comprising shading pixels would yield three shading values, e.g. (R=45%, G=48% and B=49%), such as for the location indicated by '+' in FIG. 1D.

In order to calculate the percentage of shading, a block can be added in the centre of the image sensor. Such block in the centre can always act as a reference for a group of pixels without shading. This also applies for the first and second embodiment.

It is an advantage of embodiments of the present invention that particular shading pixels, e.g. the pixels which are illustrated as encircled in FIG. 15, can function as so-called focus pixels as well. In this case, image signals from pixel pairs with apertures are analyzed, where the pixel pairs are such that they have apertures at top and bottom, or left and right, respectively. If the signal of the top and the bottom correlates, the image is in focus. Preferably, focus detection pixels have a same colour filter (e.g. green). In the embodiment of FIG. 15, such pixel pairs are separated by three interim pixels, and are not located side by side as would be the optimal case. Hence focussing may not be perfect, but it may be good enough to prepare for a fine tuning, which may then be done typically based on image sharpness of the entire image. Additional pixel lines may become unnecessary, thus decreasing the number of pixels where colour information needs to be interpolated from neighboring pixels.

Fourth Embodiment

The fourth embodiment of an image sensor 950 according to aspects of the present invention is a variant of the image sensor shown in FIG. 12. The image sensor 950 comprise a plurality of image pixels 960 and a plurality of shading detection pixels 970. The shading detection pixels are organized in blocks of 9×9 pixels comprising 72 image pixels 960 and nine shading pixels 970, illustrated in FIG. 21. Also in this embodiment, the shading pixels 970 are located in the same rectangular area as the image pixels 960, i.e. the area defined by the image pixels, and the shading pixels take the place of some of the image pixels.

Figure 21:
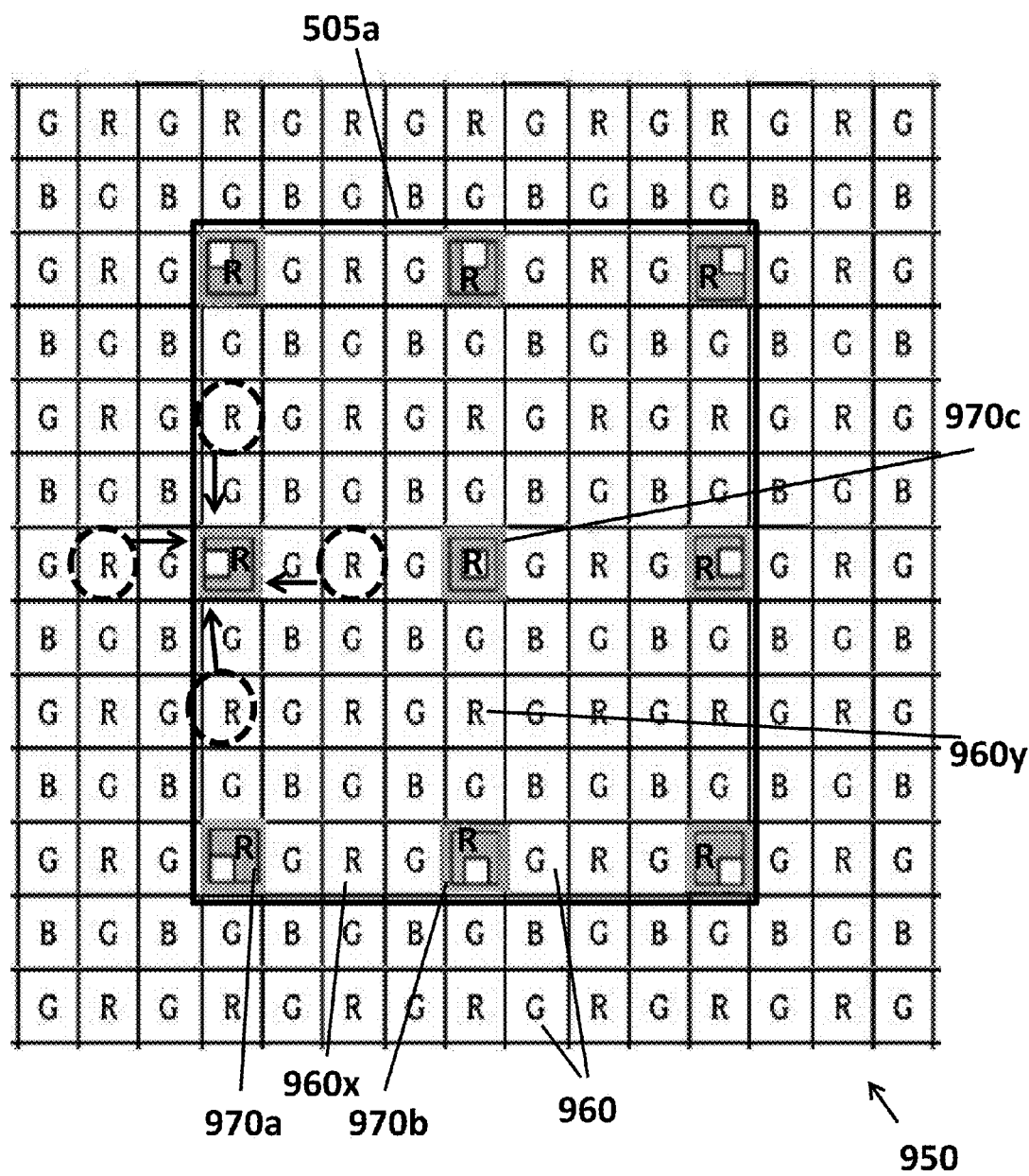
FIG. 21 illustrates in more detail a 9×9 block comprising nine shading detection pixels and seventy-two image pixels, as can be used for instance in the image sensor of FIG. 12. The shading pixels take the place of, in the embodiment illustrated, red image pixels, and are separated from one another by a plurality of image pixels of which at least one is a red pixel as well.

In this embodiment, two adjacent shading pixels 970a, 970b each covering a pixel which would be intended to sense light of a particular colour (in the example: an R-pixel), are separated from each other by a plurality of image pixels 960 (in the example: by three image pixels), at least one being adapted for sensing light of that particular colour (in the example: R). In the arrangement of FIG. 21, the shading pixels 970 take the place of original red image pixels. (The indication "R" on the shading pixels of FIG. 21 means that the shading pixels have a red colour filter). Due to the provision that at least one original red image pixel is present between every two adjacent shading pixels 970a, 970b, sufficient information from within the block of shading pixels can be obtained for providing interpolated values for red image data for the pixel positions taken by the shading pixels 970. An example is shown where four values of Red image pixels (indicated by a circle) are averaged. This will reduce potential visual artefacts compared to embodiments where no pixels of the particular colour (red in the embodiment illustrated) are available for sensing light between two adjacent shading pixels 970.

A similar solution can be used when the nine shading pixels would take the place of originally blue or green image pixels (not shown).

In embodiments of the present invention, the provision of at least one original image pixel 960 of a particular colour in between two neighbouring shading pixels 970 can be applied in two directions, as illustrated in FIG. 21, where both in horizontal and in vertical direction an original red pixel is present between two adjacent red shading pixels, e.g. 960x between 970a, 970b and 960y between 970b, 970c.

In alternative embodiments, at least one original image pixel 960 of a particular colour could be provided in between two neighbouring shading pixels 970 in one direction only, e.g. only in horizontal direction, in which case e.g. a 9×5 block of pixels comprising shading pixels may be used, or only in vertical direction, in which case e.g. a 5×9 block of pixels comprising shading pixels may be used.

It is an advantage of the different implementations of the fourth embodiment that a regular Bayer pattern can be maintained, while still sufficient information of original pixels of the particular colour are present for estimating correction values for locations where the shading pixels are present. The same advantages can also be used with colour filter arrays other than Bayern patterns.

As discussed above, these blocks can also be arranged in sets.

Fifth Embodiment

Figure 22:
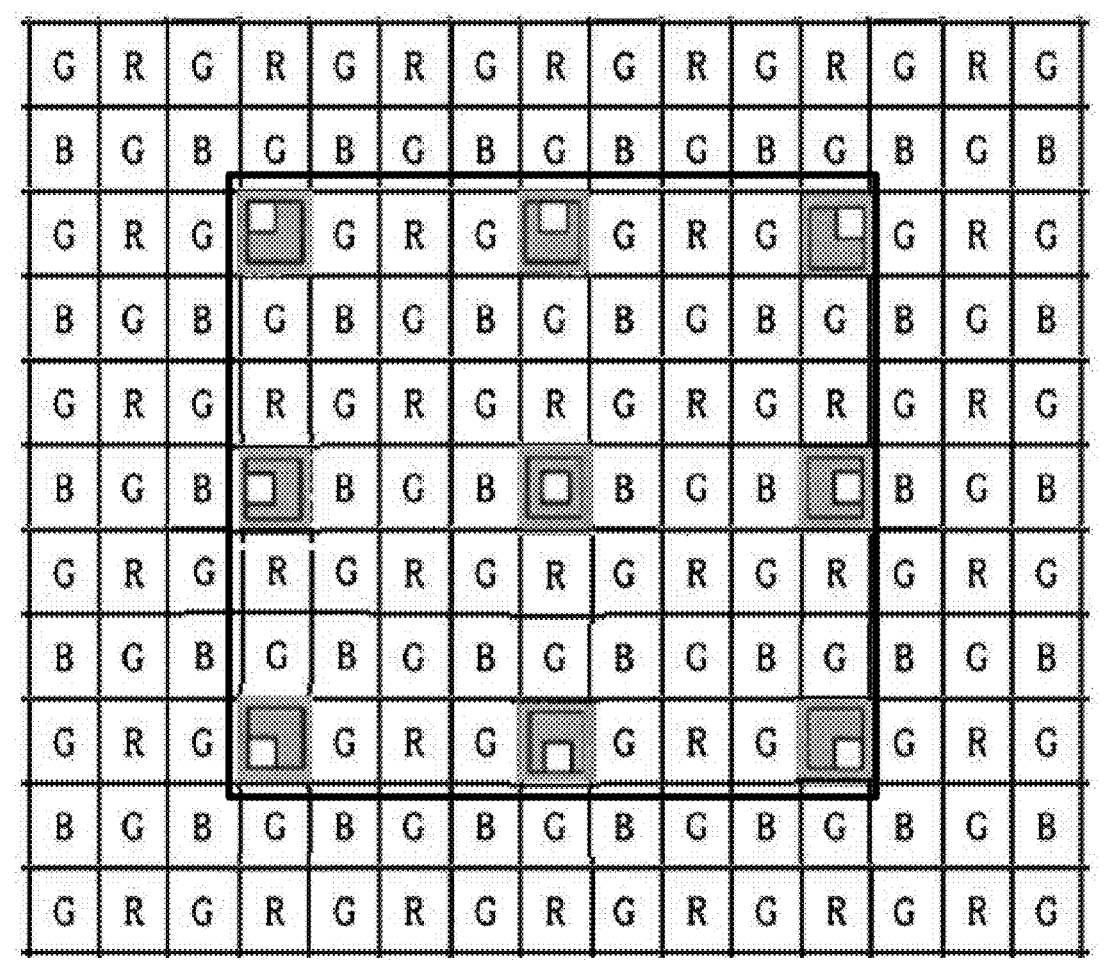

FIG. 22 illustrates a variant of FIG. 21 as a fifth embodiment of an image sensor according to the present invention, comprising image pixels and shading pixels, whereby the shading pixels are arranged in 3×3 blocks interleaved with image pixels. Here, the shading pixels are interleaved by three columns of image pixels and by two rows of image pixels, resulting in a 7×9 block.

In the example of FIG. 22, the shading pixels in the top and bottom row of the block replace red image pixels, the shading pixels in the middle row of the block replace green image pixels. It can be seen that the image data values of the pixels taken by the top and bottom row shading pixels of the block can be interpolated from four neighboring R-values (albeit at a distance of 2 pixels away from the shading pixel location), while the image data values of the pixels taken by the middle row shading pixels of the block can be interpolated from four diagonally neighboring green image pixels.

In a variant of the embodiment shown in FIG. 22, the 7×9 block may occupy image pixels of other colors than Red and Green, for example Blue and Green image pixels.

In another variant of the embodiment shown in FIG. 22, the image sensor would have 9×7 blocks, whereby the 3×3 shading pixels are interleaved by three rows and two columns of image pixels.

In another variant of the embodiment shown in FIG. 22, the image sensor would have 7×7 blocks, whereby the 3×3 shading pixels are interleaved by two rows and two columns of image pixels.

It is noted that the fourth embodiment can be seen as an arrangement of a 3×3 block interleaved with three rows and three columns of image pixels. It is also noted that in principle more than three rows and/or more than three columns may also be used, but this is undesirable, as the distance between the shading pixels would also increase, which is undesirable.

As discussed above, these blocks can also be arranged in sets.

Examples of Arrangements of Blocks and Sets

What follows are different configurations for placing the blocks or sets of shading pixels in the area defined by the image pixels. This can be applied to each of the embodiments described above. Squares with a cross are used in FIG. 17 to FIG. 19 to represent blocks or sets comprising shading pixels 330, 430, 530. This is just a graphical indication, and the square with a cross could represent any of the blocks described above: in particular e.g. a 1×9 block or a 9×1 block or a 5×5 block, or a 7×7 block or a 7×9 block or a 9×7 block, or any of the sets described above: in particular e.g. three 1×9 blocks separated by one row of image pixels (see FIG. 10), or three 1×9 blocks separated by two rows of image pixels (see FIG. 11), or three 1×9 blocks separated by one column of image pixels (not shown), or three 1×9 blocks separated by two columns of image pixels (not shown), or three 5×5 blocks arranged on the same rows (see FIG. 15), or three 5×5 blocks arranged on the same columns (not shown), or variants thereof (see e.g. FIG. 16), or three 9×9 blocks arranged on a single row (not shown), or three 9×9 blocks arranged on a single column (not shown).

Figure 17:
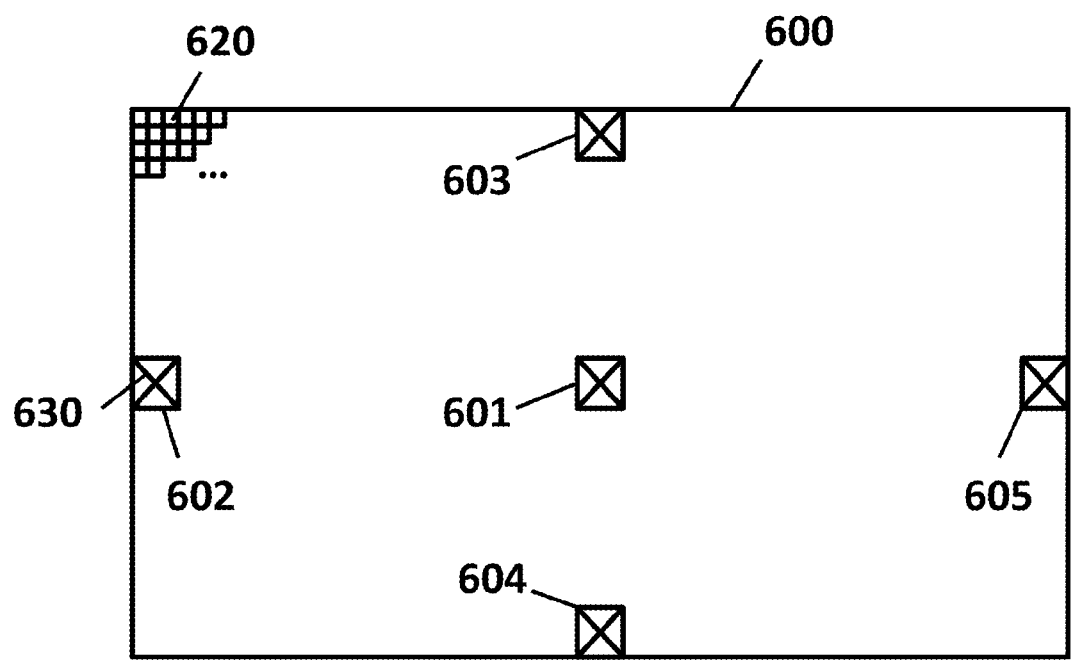
FIG. 17 shows an embodiment of an image sensor according to aspects of the present invention. The crossed square boxes represent either blocks or sets comprising shading pixels. The image sensor illustrated has five blocks or sets of shading detection pixels, and does not have focus detection pixels.

FIG. 17 shows an embodiment of an image sensor 600 according to aspects of the present invention. This image sensor does not comprise focus detection pixels, only image pixels 620 and shading pixels 630. In this example, one shading pixel block 601 is located in the centre of the image sensor 600, and four other shading pixel blocks 602, 603, 604, 605 are located substantially at the middle close to each edge. In case the crossed square represents blocks of shading pixels, five shading values can be obtained from this image sensor 600. In case the crossed squares represent sets of shading pixels, five multi-colour (also called "full colour") shading values would be obtained. Of course, variants of this arrangement may have more than five blocks or sets of shading pixels.

Figure 18:
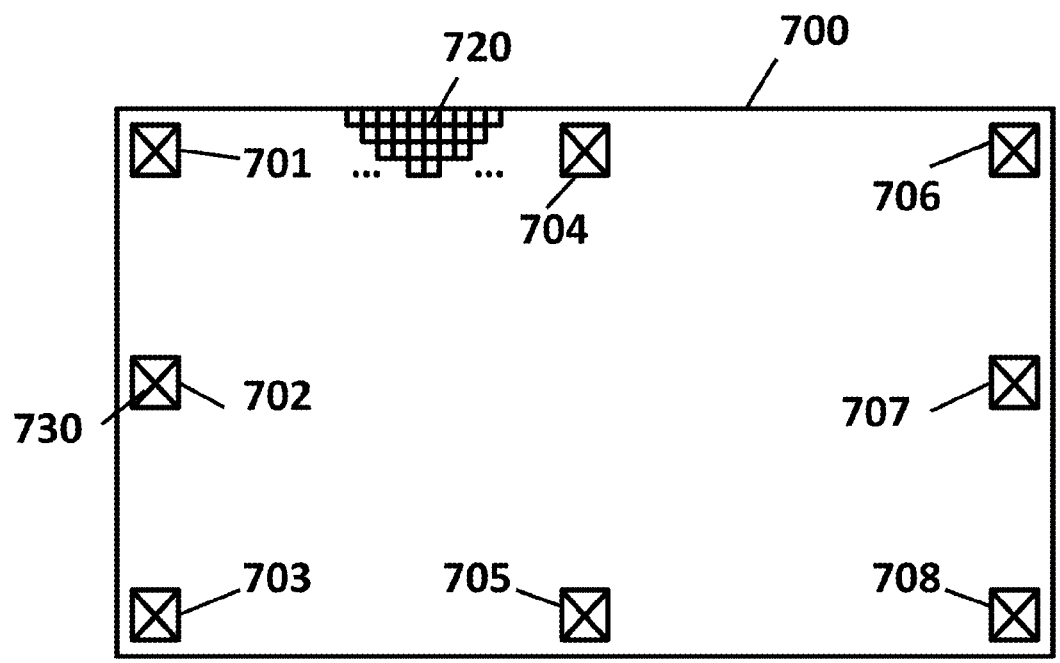
FIG. 18 shows an embodiment of an image sensor according to aspects of the present invention. The crossed square boxes represent either blocks or sets comprising shading pixels. The illustrated image sensor has eight blocks or sets of shading detection pixels, and does not have focus detection pixels.

FIG. 18 shows an embodiment of an image sensor 700 according to aspects of the present invention comprising eight blocks or sets of shading pixels 701, 702, . . . , 708. In this embodiment, blocks or sets are located substantially at each corner of the image sensor 700, and substantially in the middle of each edge, albeit at a distance therefrom (i.e. no shading pixel located on the very first or last row or column of the image sensor), which is advantageous for the restoration of the image data, as explained above. In preferred embodiments, a further block or set of shading pixels (not illustrated in FIG. 18) may be provided at the centre of the image sensor 700.

FIG. 19 shows an embodiment of an image sensor 800 according to aspects of the present invention. This image sensor comprises blocks or sets comprising shading detection pixels 830 located at various places within the light sensitive area of the image sensor 800, not only near the edges or in the corners, but also at intermediate locations between the centre and the corners or edges. This image sensor 800 also has focus detection pixels 840, indicated by the black areas. As described above, focus detection pixels 840 are optional in all embodiments of the present invention.

The embodiment shown in FIG. 19 illustrates that it is possible according to aspects of the present invention to obtain as many shading values are desired, and at any desired location, by simply placing a block or set containing shading pixels at the desired locations. The example shown has forty-two blocks or sets comprising shading pixels, but other numbers lower than forty-two or higher than forty-two can also be used. When considering that image sensors nowadays typically contain 2000×1500=3M image pixels or more, and that one block of shading pixels only requires 9 of these image pixels to be replaced by shading pixels, it is clear that such an image sensor can contain a large number, e.g. tenths, or even hundreds or thousands of blocks or sets comprising shading pixels. This permits to quantify the shading of the image sensor with a higher granularity than was possible in the prior art, while the quality of the image data can be substantially preserved.

Figure 20:
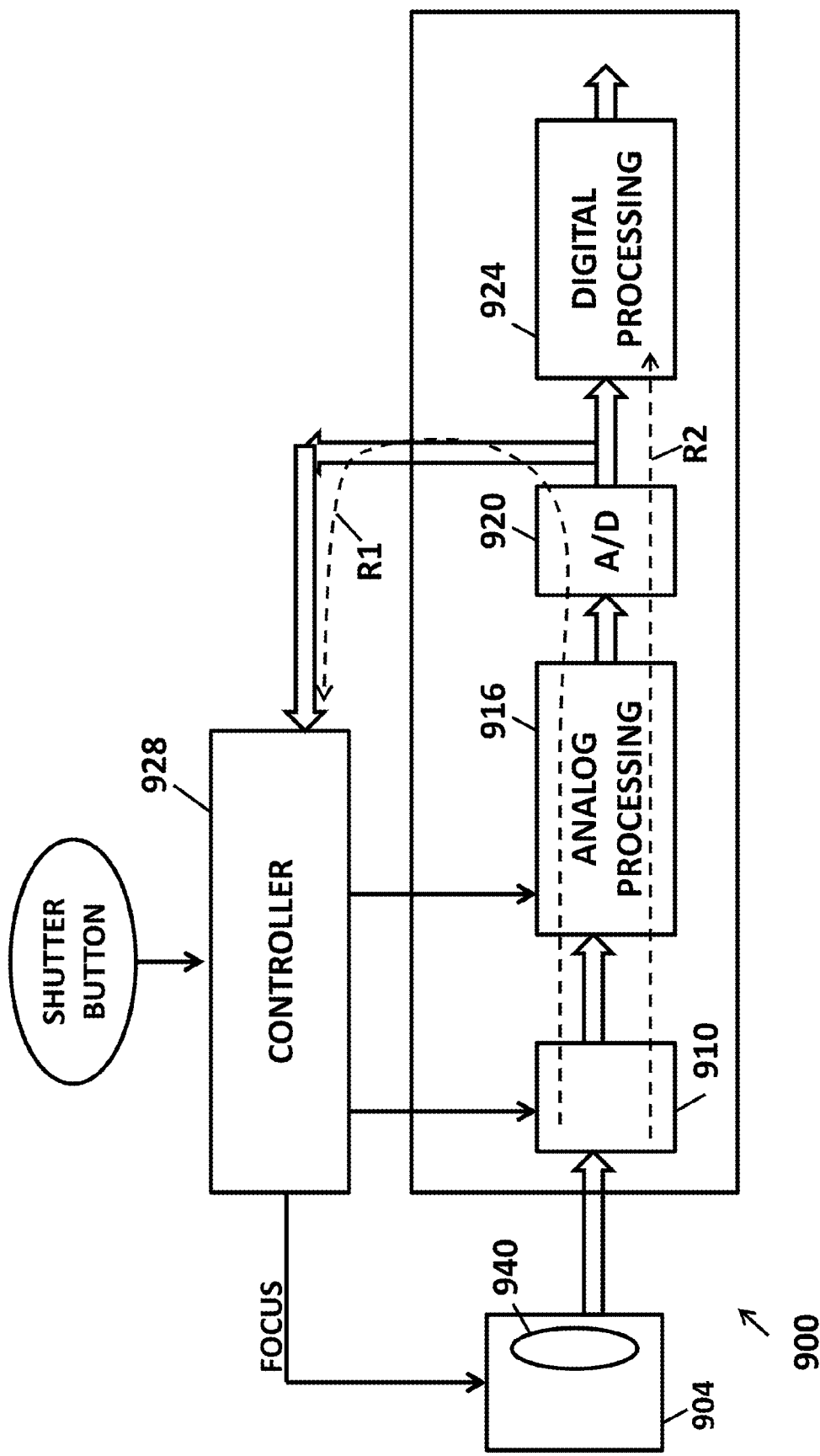
FIG. 20 shows an example of a block-diagram of a digital camera according to embodiments of the present invention.

FIG. 20 shows an example of a block-diagram of a digital camera 900 according to embodiments of the present invention. The digital camera 900 includes optics 904 that may have a conventional aperture (not shown), filter (not shown), and lens system 904 used to guide the incident light into the camera and onto an image sensor 910. The image sensor 910 comprises image pixels and shading pixels, and optionally also focus-detection pixels, as described above. The shading detection pixels are adapted for providing shading information. The focus-detection pixels, if present, are adapted for providing defocus information. All types of pixel values (image pixels, shading pixels, and optional focus detection pixels) may be subjected to analog processing in an analog processing block 916 before being forwarded to an array of analog-to-digital (A/D) converters 920 for digitizing the analog pixel values.

The digitized values obtained from the focus detection pixels, and indicative for the brightness of the scene, may be routed to a control block 928 for bringing the lens 940 into focus, using known methods.

The shading pixel values indicative for the shading effect, may be routed (via route R1) to the controller 928, which may then set appropriate values for analog amplification of the image pixels (e.g. in the analog processing block 916). Alternatively the shading pixel values may be routed (via route R2) to the digital processor block 924, where the amplification can be performed in the digital domain (e.g. in the digital processing block 924).

The image pixel values are routed to a digital processing block 924 and may be subjected to digital processing (e.g. cross-talk-correction, and image data estimation for the locations of the shading pixels and optionally also focus detection pixels, etc) before being provided as digitized image data or digitized video data, which may be stored e.g. after file formatting, on a digital memory (not shown). The controller 928, the image sensor 910, the analog processing block 916, the A/D block 920 and the digital processing block 924 may be integrated in a single integrated circuit implemented in CMOS technology.

Route R1 indicates the path followed by the shading correction data (charge, analog value, digital value) obtained from the shading pixels (if present) into the controller 928, for performing shading correction using known algorithms. This path may also be followed by focus-detection data, in which case the controller 928 would provide control signals to the digital processing block 924 for focus correction.

Route R2 indicates the path followed by the image related data (charge, analog value, digital value) obtained from the image pixels into the digital processing block 924. This path may also be followed by the shading correction data, in which case the digital processor 924 would extract the shading information for performing the shading correction using known algorithms.

The analog processing block 916 may include known circuitry, such as e.g. correlated double sampling circuitry, as well as any gain and filtering, or offset correction.

The A/D converters in block 920 may comprise e.g. 8-bit or 10-bit or 12-bit or even more bits analog to digital convertors.

The control block 928 may be implemented in hardware, or in a programmable controller, such as e.g. a DSP (digital signal processor), provided with an algorithm for reading or extracting a plurality of shading pixel values and for setting analog amplifiers accordingly. Optionally the control block 928 is further adapted for reading or extracting focus detection pixel values and for controlling the position of the lens 940 using known algorithms.

The digital processing block 924 may also be implemented in hardware, or in a programmable DSP, which may be the same or another processor than the control block 928.

REFERENCE NUMBERS

100 solid state imaging device
110 light receiving region
110A effective pixel part
110B available pixel part
110C optical black region
114 light shielding film
120 image pixel
130 shading detection pixel
115A output amplifier
115B output amplifier
116A pad electrode
116B pad electrode
A-G 3×3 pixel block of shading pixels
200 image sensor
240 focus detection pixels
300 image sensor
301-303 zones of focus detection pixels
304-309 blocks of shading detection pixels
310 light shield
311 aperture in the light shield
320 image pixels
330 shading pixels
340 focus detection pixels
400 image sensor
401-403 zones of focus detection pixels
404-409 blocks of shading detection pixels
420 image pixels
430 shading pixels
440 focus detection pixels
500 image sensor
501-503 zones of focus detection pixels
504-507 blocks of shading detection pixels
520 image pixels
530 shading pixels
540 focus detection pixels
600 image sensor
601-605 blocks or sets of shading detection pixels
620 image pixels
630 shading pixels
700 image sensor
701-708 blocks or sets of shading detection pixels
720 image pixels
730 shading pixels
800 image sensor
801-803 zones with focus detection pixels
820 image pixels
830 shading pixels
840 focus detection pixels
900 digital camera
904 optics
910 image sensor
916 Analog processing unit
920 Analog to Digital convertors
924 Digital processing unit
928 Controller
940 movable lens
950 image sensor
960 image pixel
970 shading pixel
R1 first path/route
R2 second path/route

The invention claimed is:

1. An image sensor comprising a plurality of pixels arranged in rows and columns, the plurality of pixels comprising:
   image pixels arranged and adapted for providing image data, and
   shading detection pixels arranged and adapted for providing signals from which an amount of shading can be deduced;
   readout circuitry for readout of the image pixels;
   characterized in that:
   the shading detection pixels are located in the area defined by the image pixels such that the shading detection pixels are completely surrounded by image pixels;
   the shading detection pixels are arranged such that each shading detection pixel has at least one direct neighbouring image pixel, and
   the readout circuitry is configured to be used also for readout of the shading detection pixels.

2. The image sensor according to claim 1, wherein the shading detection pixels are organized in blocks of pixels comprising at least nine shading detection pixels, each of the nine shading detection pixels being covered by a light shield having an aperture for passing incident light, each aperture having a centre that is offset from the corresponding photoelectric conversion element centre by a fixed distance that is predetermined for that shading detection pixel.

3. The image sensor according to claim 2, wherein the shading detection pixels of each individual block comprise a colour filter of a single colour.

4. The image sensor according to claim 3, wherein the shading detection pixels are arranged in sets, each set comprising a plurality of blocks, the shading detection pixels within each block comprising a colour filter of a single colour, the colour being different for at least two blocks in the set.

5. The image sensor according to claim 1, wherein the shading detection pixels are organized in blocks of pixels comprising at least nine shading detection pixels, each of the nine shading detection pixels being covered by a micro-lens having an optical axis, whereby each of the shading detection pixels of the block is disposed so that its optical axis is offset from the corresponding photoelectric conversion element centre by a fixed distance that is predetermined for that shading detection pixel.

6. The image sensor according to claim 1, wherein each block comprises nine shading detection pixels, and wherein the nine shading detection pixels of the block are arranged in a 1×9 arrangement or in a 9×1 arrangement.

7. The image sensor according to claim 1, wherein each block comprises nine shading detection pixels, and wherein the shading detection pixels are organized in a 3×3 arrangement interleaved by a plurality of image pixels, e.g. in a 5×5 arrangement or a 5×7 arrangement or a 5×9 arrangement or a 7×5 arrangement or a 7×7 arrangement or a 7×9 arrangement or a 9×5 arrangement or a 9×7 arrangement or a 9×9 arrangement.

8. The image sensor according to claim 7, wherein a Bayer colour pattern is used for the image pixels, and wherein the shading detection pixels are located such as to take the place of green image pixels.

9. The image sensor according to claim 1, further comprising a plurality of focus-detection pixels for determining defocus information of a lens positioned at a distance from the image sensor.

10. The image sensor according to claim 9, wherein the focus-detection pixels are arranged in rows, and wherein the image sensor is a CMOS image sensor of a column-level ADC architecture.

11. The image sensor according to claim 1, wherein at least a pair of shading detection pixels also has a function of focus detection pixels.

12. A digital camera comprising:
an image sensor according to claim 1;
image correction circuitry for calculating image information for the pixel positions taken by the shading detection pixels;
shading-correction circuitry for correcting the image data based on shading information obtained from the shading detection pixels.

13. The digital camera according to claim 12, wherein the image correction circuitry and the shading correction circuitry comprise a programmable digital signal processor provided with an algorithm for interpolating image data, and for performing shading correction of the image data.

14. The digital camera of claim 12,
the image sensor further comprising a plurality of focus-detection pixels for determining defocus information of a lens positioned at a distance from the image sensor,
the digital camera further comprising
the lens, and a drive mechanism for moving the lens;
auto-focus circuitry for generating a control signal and for applying the control signal to the drive mechanism for moving the lens for focusing an image on the image sensor.

15. The image sensor according to claim 1, wherein each block comprises nine shading detection pixels, and wherein the nine shading detection pixels of the block are arranged in a 1×9 arrangement, and wherein the image sensor is a CMOS image sensor of a column-level ADC architecture.

* * * * *